(12) United States Patent
Kitani

(10) Patent No.: US 7,500,101 B2
(45) Date of Patent: Mar. 3, 2009

(54) RECORDING/REPRODUCTION DEVICE, DATA PROCESSING DEVICE, AND RECORDING/REPRODUCTION SYSTEM

(75) Inventor: Satoshi Kitani, Tokyo (JP)

(73) Assignee: Sony Corporation, Tokyo (JP)

( * ) Notice: Subject to any disclaimer, the term of this patent is extended or adjusted under 35 U.S.C. 154(b) by 926 days.

(21) Appl. No.: 10/500,152

(22) PCT Filed: Dec. 4, 2003

(86) PCT No.: PCT/JP03/15525

§ 371 (c)(1),
(2), (4) Date: Jul. 12, 2004

(87) PCT Pub. No.: WO2004/053699

PCT Pub. Date: Jun. 24, 2004

(65) Prior Publication Data

US 2005/0081047 A1    Apr. 14, 2005

(30) Foreign Application Priority Data

Dec. 6, 2002    (JP) .............................. 2002-355114

(51) Int. Cl.
*H04L 9/00* (2006.01)

(52) U.S. Cl. ....................... 713/169; 713/168; 713/189; 713/193; 380/44; 380/201; 380/277; 380/281; 380/286

(58) Field of Classification Search ................. 713/168, 713/169, 189, 193; 380/44, 277, 281, 286, 380/201
See application file for complete search history.

(56) References Cited

U.S. PATENT DOCUMENTS

| | | | |
|---|---|---|---|
| 5,805,699 A * | 9/1998 | Akiyama et al. | 705/58 |
| 7,065,648 B1 * | 6/2006 | Kamibayashi et al. | 713/171 |
| 7,224,804 B2 * | 5/2007 | Ishiguro et al. | 380/279 |
| 7,225,341 B2 * | 5/2007 | Yoshino et al. | 713/193 |
| 2002/0120847 A1 * | 8/2002 | Kamperman | 713/170 |
| 2004/0187001 A1 * | 9/2004 | Bousis | 713/175 |

FOREIGN PATENT DOCUMENTS

| | | |
|---|---|---|
| JP | 9-134311 | 5/1997 |
| JP | 2000-261472 | 9/2000 |
| JP | 2001-256113 | 9/2001 |
| JP | 2001-351323 | 12/2001 |
| JP | 2002-237808 | 8/2002 |

* cited by examiner

*Primary Examiner*—Kim Yen Vu
*Assistant Examiner*—Beemnet W Dada
(74) *Attorney, Agent, or Firm*—Oblon, Spivak, McClelland, Maier & Neustadt, P.C.

(57) ABSTRACT

A device key 46 is implemented on a drive 4 side. To securely transmit the device key 46 to a host 5, the device key 46 is encrypted with a bus key. The host 5 side decrypts the device key with the bus key. A medium unique key calculating block 55 calculates a medium unique key with an MKB 12, a medium ID, and the decrypted device key 46. When the calculated medium key is a predetermined value, the drive 4 is revoked and the process is stopped. The medium unique key is supplied to an encrypting/decrypting module 54. A content key is obtained with an encrypted title key 14 and a CCI 15. With the content key, an encrypted content is decrypted and a content that is recorded is encrypted.

10 Claims, 18 Drawing Sheets

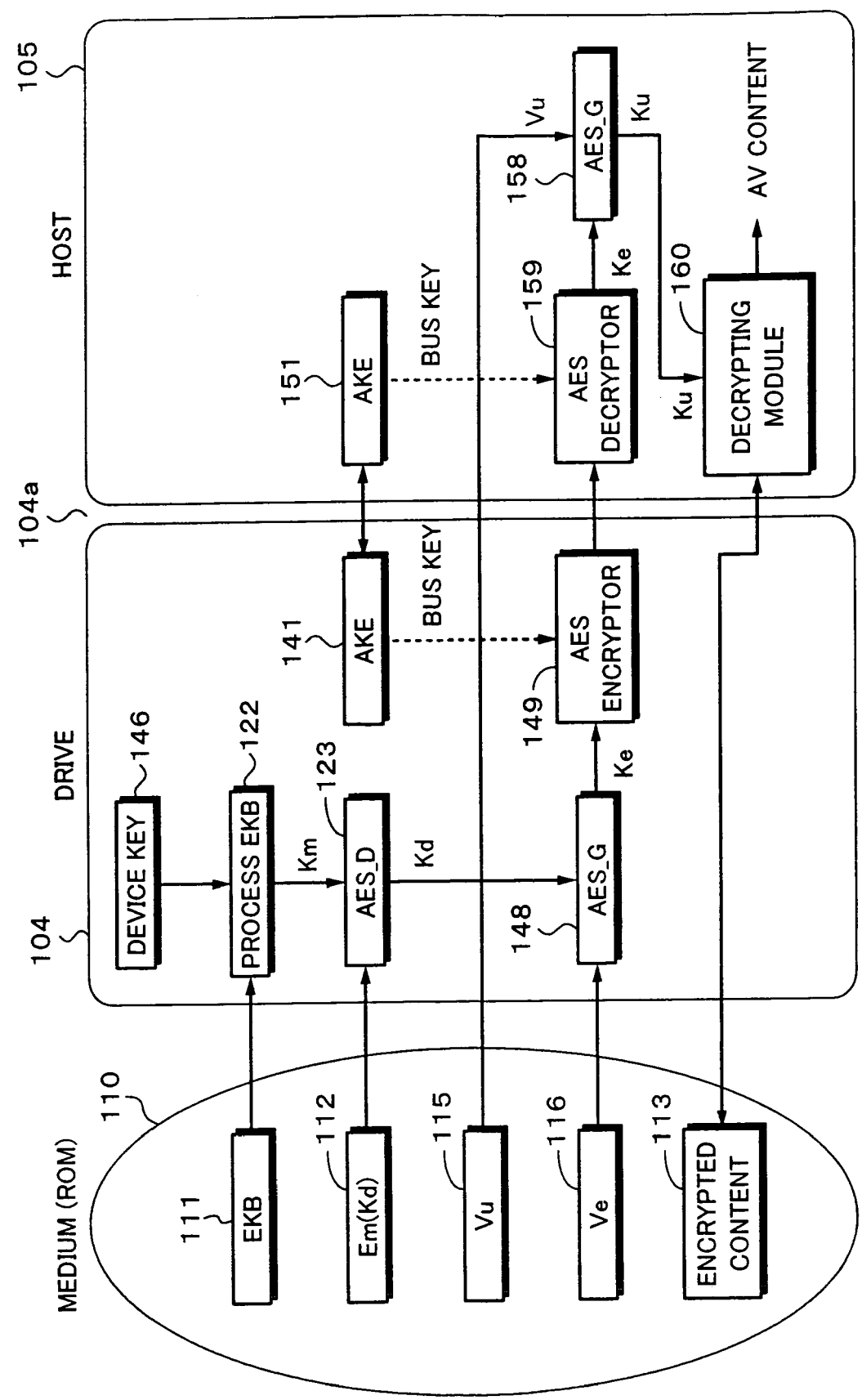

RECORDING/REPRODUCTION DEVICE, DATA PROCESSING DEVICE, AND RECORDING/REPRODUCTION SYSTEM

TECHNICAL FIELD

The present invention relates to a recording and reproducing apparatus, a data processing apparatus, and a recording, reproducing, and processing system that cause for example a drive connected to a personal computer to record an encrypted content to a disc medium loaded into the drive and to reproduce an encrypted content from a disc medium.

BACKGROUND ART

On one recording medium such as a DVD (Digital Versatile Disc), which has been recently developed, a large capacity of data for one movie can be recorded as digital information. When video information and so forth can be recorded as digital information, it will become important to protect copyright of digital information against illegal copies.

In DVD-Video, as a copy protection technology, CSS (Content Scrambling System) has been employed. The use of the CSS is permitted for only DVD mediums, not recordable DVDs such as a DVD-R, a DVD-RW, DVD+R, DVD+RW, and so forth due to CSS contract. Thus, the CSS contract does not permit the user to copy the contents of a DVD-Video disc to a recordable DVD (so-called bit-by-bit copy).

However, there was a serious situation of which the CSS encrypting system was broken. Illegal software called "DeCSS" that easily decrypts contents that has been encrypted in accordance with the CSS encryption system and copies the decrypted contents to a hard disk was published on the Internet. As a background of the advent of "DeCSS", reproduction software was designed with a CSS decryption key that was not anti-tampered although it was supposed to be anti-tampered. The reproduction software was reverse-engineered and the encryption key was decrypted. As a result, all the CSS algorithm was decrypted.

As a successor of the CSS, CPPM (Content Protection for Pre-Recorded Media) as a copyright protection technology for DVD-ROMs such as a DVD-Audio disc and CRPM (Content Protection for Recordable Media) as a copyright protection technology for recordable DVDs and memory cards have been proposed. In these systems, even if there is a problem about encryption for contents, storage of management information, and so forth, the systems can be updated. Even if data of a whole disc is copied, the reproduction can be restricted. A method for protecting copyright for DVDs is described in the following non-patent related art reference 1. The CRPM is described in the following document distributed by its licenser, 4C Entity, LLC, USA.

"Spreading-out Copyright Protection Space Starting from DVD", Yamada, Nikkei Electronics, pp. 143-153, 2001. 8. 13.

"Content Protection for Recordable Media Specification DVD Book"

Under a personal computer (hereinafter, sometimes abbreviated as PC) environment, since a PC and a drive are connected with a standard interface, secret data may be leaked out or tampered at the standard interface. As a result, there is a risk of which application software may be reverse-engineered and secret information may be stolen or tampered. Such a risk hardly occurs in an electronic apparatus that has a recording and reproducing apparatus that is integrated thereinto.

When a copyright protection technology is implemented to an application program that is executed on a PC, to prevent the copyright protection technology from being analyzed, the application program is generally anti-tampered. However, there is no index that represents the strength of tamper-resistance. As a result, countermeasures against reverse-engineering depend on the decision and capability of each implementer. As a result, the CSS was broken. With respect to the copyright protecting technologies CPPM for DVD-ROM and so forth and CRPM for recordable DVDS, where were proposed as a successor of the CSS, an engineering method that allows a problem about implementation of software to a PC to be solved has not been proposed.

An object of the present invention is to secure the safety of a copyright protecting technology under the PC environment. In other words, an object of the present invention is to provide a recording and reproducing apparatus, a data processing apparatus, and a recording, reproducing, and processing system that prevent a drive that is not validly licensed from being produced and that allow it to be securely revoked.

DISCLOSURE OF THE INVENTION

A first aspect of the present invention is a recording and reproducing apparatus, comprising:

at least one of a recording portion for recording encrypted data to a recording medium having first information that is unique thereto and a reproducing portion for reproducing encrypted data recorded on the recording medium;

a storing portion for storing second information uniquely assigned to a valid electronic apparatus or valid application software; and a connecting portion for mutually authenticating a data processing apparatus for at least encrypting data or decrypting encrypted data with a key generated in accordance with both the first information unique to the recording medium and the second information stored in the storing portion.

A second aspect of the present invention is a recording and reproducing apparatus, wherein the data processing apparatus has a revoke processing portion for performing revocation with at least the second information stored in the storing portion and the first information unique to the recording medium when the second information stored in the storing portion is not information unique to a valid electronic apparatus or valid application software, and wherein the connecting portion is configured to send the second information stored in the storing portion to the data processing apparatus.

A third aspect of the present invention is a recording and reproducing apparatus, further comprising:

a revoke processing portion for performing revocation with the second information stored in the storing portion and the first information unique to the recording medium when the second information stored in the storing portion is not information unique to a valid electronic apparatus or valid application software.

A fourth aspect of the present invention is a recording and reproducing apparatus, comprising:

at least one of a recording portion for recording encrypted data to a recording medium having first information that is unique thereto and a reproducing portion for reproducing encrypted data recorded on the recording medium;

a storing portion for storing second information uniquely assigned to a valid electronic apparatus or valid application software;

a connecting portion for mutually authenticating a data processing apparatus for at least encrypting data or decrypting encrypted data with a key generated in accordance with both the first information unique to the recording medium and the second information stored in the storing portion; and a revoke processing portion for performing revocation with the second information sent from the data processing apparatus through at least the connecting portion and stored in the storing portion and the first information unique to the recording medium when the second information stored in the storing portion is not information unique to a valid electronic apparatus or valid application software.

A fifth aspect of the present invention is a data processing apparatus, comprising:

a connecting portion for mutually authenticating a recording and reproducing apparatus for at least recording encrypted data to a recording medium having second information uniquely assigned to only a valid electronic apparatus or valid application software and first information unique thereto or reproducing encrypted data therefrom; and a processing portion for at least encrypting data or decrypting encrypted data with a key generated in accordance with both the first information unique to the recording medium and sent from the recording and reproducing apparatus through the connecting portion and the second information unique to the electronic apparatus or application software.

A sixth aspect of the present invention is a data processing apparatus, wherein the data processing apparatus has a revoke processing portion for performing revocation with both the second information sent from the recording and reproducing apparatus through the connecting portion and the first information unique to the recording medium when the second information is not information unique to a valid electronic apparatus or valid application software.

A seventh aspect of the present invention is a data processing apparatus, wherein the data processing apparatus is connected to the recording and reproducing apparatus that has a revoke processing portion for performing revocation with both the second information stored in at least the recording and reproducing apparatus and the first information unique to the recording medium when the stored second information is not information unique to a valid electronic apparatus or valid application software.

An eighth aspect of the present invention is a data processing apparatus, comprising:

a storing portion for storing second information uniquely assigned to only a valid electronic apparatus;

a connecting portion for mutually authenticating a recording and reproducing apparatus for at least recording encrypted data to a recording medium having first information unique thereto and reproducing encrypted data recorded on the recording medium; and a processing portion for at least encrypting data or decrypting encrypted data with a key generated in accordance with both the first information unique to the recording medium and the second information stored in the storing portion, wherein the second information stored in the storing portion is sent to the recording and reproducing apparatus that has a revoke processing portion for performing revocation when the second information stored in the storing portion is not information unique to a valid electronic apparatus or valid application software.

A ninth aspect of the present invention is a recording, reproducing, and processing system, comprising:

a recording and reproducing apparatus for at least recording encrypted data to a recording medium having first information that is unique thereto or reproducing encrypted data recorded on the recording medium, the recording and reproducing apparatus having second information uniquely assigned to a valid electronic apparatus or valid application software; and a data processing apparatus for at least encrypting data or decrypting encrypted data with a key generated in accordance with both the second information at least stored in the recording and reproducing apparatus and the first information unique to the recording medium.

A tenth aspect of the present invention is a recording, reproducing, and processing system, wherein the data processing apparatus has a revoke processing portion for performing revocation with the first information unique to the recording medium and the second information stored in the data processing apparatus when the second information stored therein is not information that is unique to a valid electronic apparatus or valid application software.

An eleventh aspect of the present invention is a recording, reproducing, and processing system, wherein the recording and reproducing apparatus has a revoke processing portion for performing revocation with the first information unique to the recording medium and the second information stored in the data processing apparatus when the stored second information is not information that is unique to a valid electronic apparatus or valid application software.

A twelfth aspect of the present invention is a recording, reproducing, and processing system, comprising:

a recording and reproducing apparatus for storing second information uniquely assigned to only a valid electronic apparatus or valid application software and at least recording encrypted data to a recording medium having first information unique thereto or reproducing encrypted data recorded on the recording medium; and a data processing apparatus for encrypting data or decrypting encrypted data with a key generated in accordance with both the second information stored in the recording and reproducing apparatus and the first information unique to the recording medium, wherein the data processing apparatus is configured to send the second information stored in the storing portion thereof to the recording and reproducing apparatus having a revoke processing portion for performing revocation when the second information stored in the recording and reproducing apparatus is not information unique to a valid electronic apparatus or valid application software.

A thirteenth aspect of the present invention is a recording and reproducing apparatus, comprising:

at least one of a recording portion for recording encrypted data to a recording medium on which first information for revoking an invalid electronic apparatus, second information that is unique to each content, third information that can be defined for each encrypting unit, and identification data that is unique to each stamper are recorded and a reproducing portion for reproducing encrypted data from the recording medium;

a storing portion for storing fourth information uniquely assigned to a valid electronic apparatus or valid application software, a revoke processing portion for determining whether or not the stored fourth information is information unique to a valid electronic apparatus or valid application software in accordance with the first information and the fourth information; and a calculating portion for obtaining intermediate key information unique to each recording medium in accordance with the first information, the fourth information, the second information, and the identification data when the revoke processing portion has determined that the fourth information is information unique to a valid electronic apparatus or valid application software.

According to the present invention, second information for example a device key uniquely assigned to a valid electronic apparatus or valid application software is stored in a recording and reproducing apparatus. Thus, the device key cannot be read from the outside of the recording and reproducing apparatus. An application that is installed in a data processing apparatus does not need to have data of a copyright protection technology. Thus, the software can withstand an analysis of reverse engineering. As a result, the safety of the copyright protection technology can be secured. In addition, to allow a recording and reproducing apparatus to validly deal with a recording medium, since the apparatus needs to have secret information of a copyright protection technology such as a device key, a clone apparatus that pretends to be a valid apparatus without having a valid license can be prevented from being produced.

According to the present invention, a part of an algorithm of a copyright protection technology for example a calculation of a medium unique key is implemented in a recording and reproducing apparatus. As a result, an application that is installed in a data processing apparatus needs to have only a part of the algorithm of the copyright protection technology, the application can withstand an analysis of reverse engineering. Thus, the safety of the copyright protection technology can be secured.

BRIEF DESCRIPTION OF DRAWINGS

FIG. 18 is a block diagram showing a PC based ROM type medium reproducing system according to a ninth embodiment of the present invention.

BEST MODES FOR CARRYING OUT THE INVENTION

Figure 1:
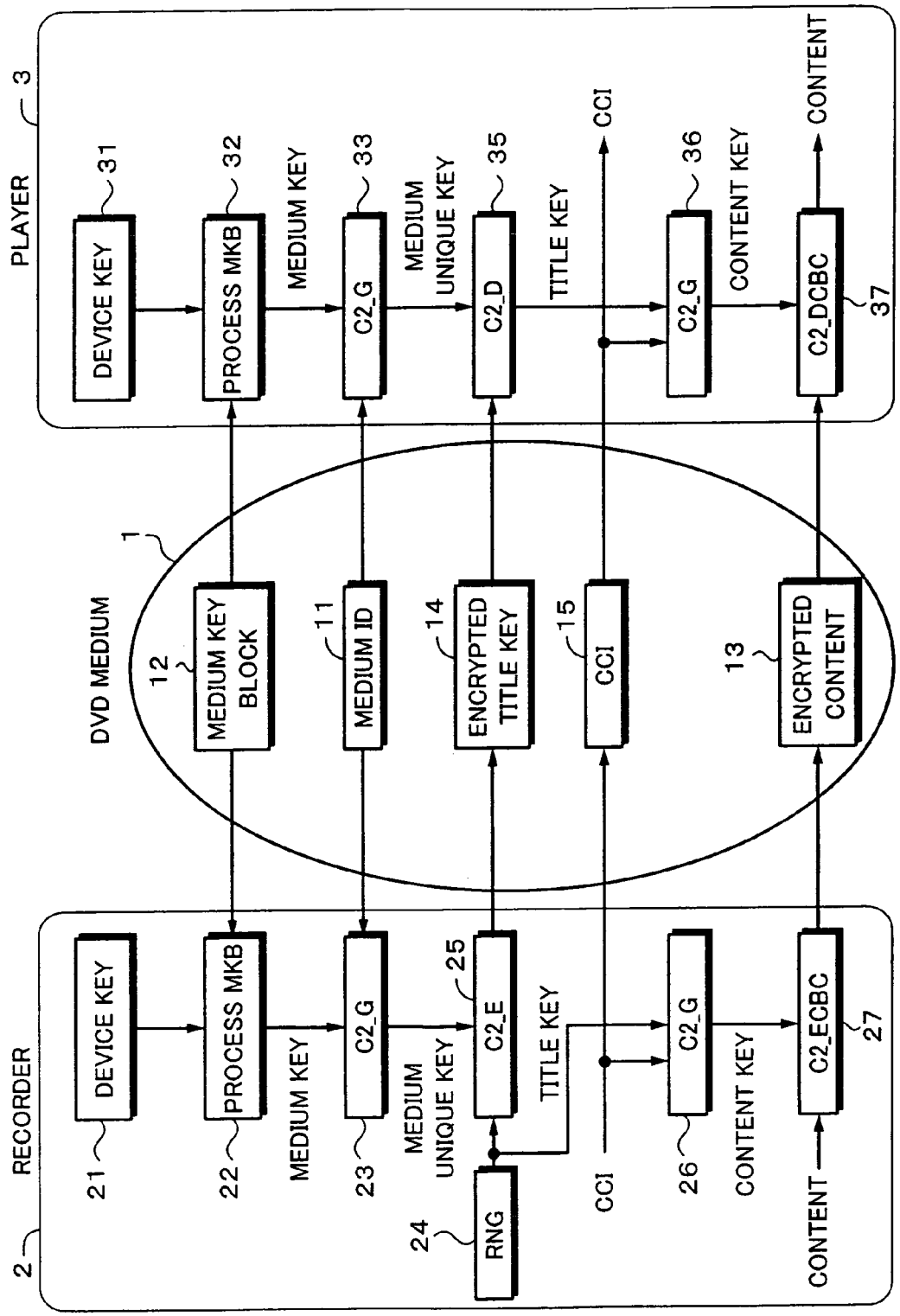
FIG. 1 is a block diagram describing a proposed system comprising a recorder, a player, and a DVD medium.

For easy understanding of the present invention, first of all, with reference to FIG. 1, a copyright protection technology for example an architecture of the CPRM for DVDs will be described. In FIG. 1, reference numeral 1 represents for example a recordable DVD medium such as DVD-R/RW or DVD-RAM based on the CPRM standard. Reference numeral 2 represents for example a recorder based on the CPRM standard. Reference numeral 3 represents for example a player based on the CPRM standard. The recorder 2 and the player 3 are each an apparatus or application software.

In a blank state of the DVD medium 1, in areas called BCA (Burst Cutting Area) or NBCA (Narrow Burst Cutting Area) of a lead-in area on the innermost periphery side of the DVD medium 1, a medium ID 11 is recorded. In an emboss or pre-recorded data zone of the lead-in area, a medium key block (hereinafter sometimes abbreviated as MKB) 12 is pre-recorded. The medium ID 11 is a number that is unique to each medium for example disc. The medium ID 11 is composed of a medium manufacturer code and a serial number. The medium ID 11 is required when a medium key is converted into a medium unique key that is unique to each medium. A medium key block MKB is a bundle of keys to obtain a medium key and revoke the apparatus. The medium ID and medium key block are first information unique to the recording medium.

In a data rewritable or recordable region of the disc 1, an encrypted content 13 that is encrypted with a content key is recorded. As an encrypting system, C2 (Cryptomeria Ciphering) is used.

On the DVD medium 1, an encrypted title key 14 and a CCI (Copy Control Information) 15 are recorded. The encrypted title key 14 is encrypted title key information. The title key information is key information that is added for each title. The CCI is copy control information such as copy no more, copy once, copy free, or the like.

The recorder 2 comprises structural elements that are a device key 21, a process MKB 22, a C2_G 23, a random number generator 24, a C2_E 25, a C2_G 26, and a C2_ECBC 27. The player 3 comprises structural elements that are a device key 31, a process MKB 32, a C2_G 33, a C2_D 35, a C2_G 36, and a C2_DCBC 37.

The device keys 21 and 31 are identification numbers issued for each apparatus maker or each application software vendor. A device key is information unique to a valid electronic apparatus or valid application software assigned by a licenser. The MKB 12 and the device key 21 reproduced from the DVD medium 1 are calculated by the process MKB 22 so as to determine whether or not the electronic apparatus or application software has been revoked. Like the recorder 2, in the player 3, the MKB 12 and the device key 31 are calculated b the process MKB 32 so as to determine whether or not the player 3 has been revoked.

The processes MKB 22 and 32 each calculate a medium key with the MKB 12 and the device keys 21 and 31. When the MKB 12 does not contain a device key of the recorder 2 or the player 3 and the calculated result matches a predetermined value for example 0, it is determined that the recorder 2 or player 3 that has the device key is not valid. In other words, the recorder 2 or player 3 is revoked.

The C2_G 23 and the C2_G 33 are processes each of which calculates a medium key and a medium ID and obtains a medium unique key.

The random number generator (RNG) 24 is used to generate a title key. A title key generated by the random number generator 24 is input to the C2_E 25. The title key is encrypted with a medium unique key. The encrypted title key 14 is recorded on the DVD medium 1.

In the player 3, the encrypted title key 14 and the medium unique key reproduced from the DVD medium 1 are supplied to the C2_D 35. The encrypted title key is decrypted with the medium unique key. As a result, the title key is obtained.

In the recorder 2, the CCI and the title key are supplied to the C2_G 26. The C2_G 26 obtains a content key. The content key is supplied to the C2_ECBC 27. The C2_ECBC 27 encrypts a content with the content key. The encrypted content 13 is recorded on the DVD medium 1.

In the player 3, the CCI and the title key are supplied to the C2_G 36. The C2_G 36 obtains a content key. The content key is supplied to the C2_DCBC 37. The encrypted content 13 reproduced from the DVD medium 1 is decrypted with the content key.

In the structure shown in FIG. 1, a recording process for the recorder 2 will be described. The recorder 2 reads the MKB 12 from the DVD medium 1. The process MKB 22 calculates the device key 21 and the MKB 12 and obtains a medium key. When the calculated result matches a predetermined value, it is determined that the device key 21 (the apparatus or application of the recorder 2) has been revoked by the MKB. At that point, the recorder 2 stops the current process and prohibits a content from being recorded to the DVD medium 1. If the value of the medium key does not match the predetermined value, the recorder 2 continues the current process.

The recorder 2 reads the medium ID 11 from the DVD medium 1 and inputs the medium ID and the medium key to the C2_G 23. The C2_G 23 calculates the medium ID and the medium key and obtains a medium unique key that is unique to each medium. The title key generated by the random number generator 24 is encrypted by the C2_E 25. The encrypted title key 14 is recorded on the DVD medium 1. The title key and the CCI information of the content are calculated by the C2_G 26. As a result, the C2_G 26 obtains a content key. The C2_ECBC 27 encrypts the content with the content key. The encrypted content 13 and the CCI 15 are recorded on the DVD medium 1.

Next, a reproducing process of the player 3 will be described. First of all, the MKB 12 is read from the DVD medium 1. The device key 31 and the MKB 12 are calculated so as to determine whether or not the device key 31 has been revoked. When the device key 31 namely the apparatus or application of the player 3 has not been revoked, a medium unique key is calculated with the medium ID. With the encrypted title key 14 and the medium unique key, a title key is calculated. The title key and the CCI 15 are input to the C2_G 36. As a result, a content key is obtained. The content key is input to the C2_DCBC 37. The C2_DCBC 37 calculates the encrypted content 13 reproduced from the DVD medium 1 with the content key. As a result, the encrypted content 13 is decrypted.

To obtain a content key necessary for decrypting a content, a unique medium ID is required for each DVD medium. Thus, even if an encrypted content on a medium is copied to another medium, since the medium ID of the other medium is different from the medium ID of the original medium, the copied content cannot be decrypted. As a result, the copyright of the content can be protected.

Figure 2:
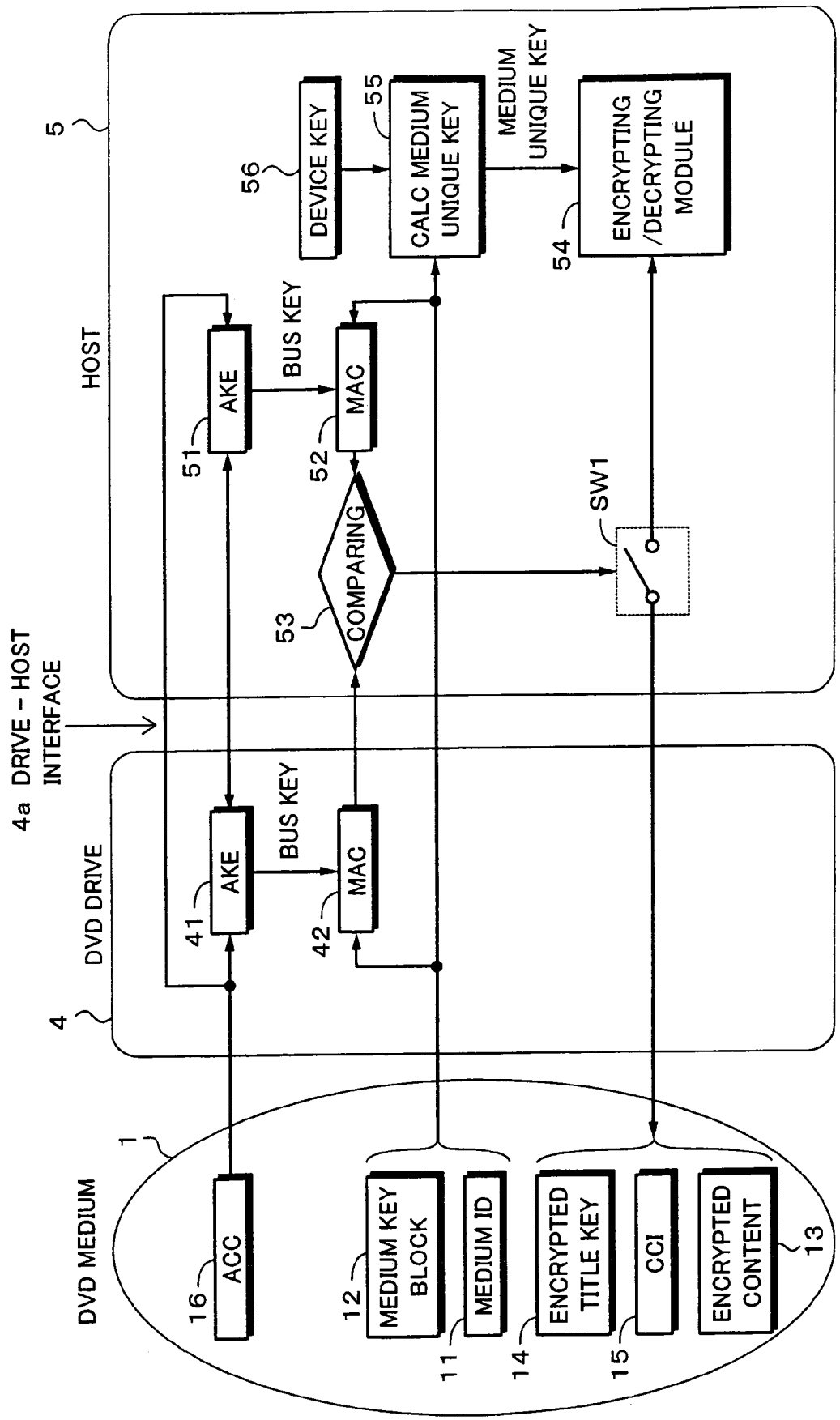
FIG. 2 is a block diagram describing a PC based DVD medium recording and reproducing system.

The structure shown in FIG. 1 is a recording and reproducing apparatus. The present invention is applied to the case that the content protecting process for the DVD medium 1 is performed under a PC environment. Next, with reference to FIG. 2, roles shared by a PC and a drive according to a conventional system will be described. In FIG. 2, reference numeral 4 represents a DVD drive as a recording and reproducing apparatus that records and reproduces a content to and from a DVD medium 1 based on the foregoing CPRM standard will be described.

Reference numeral 5 represents a host for example a PC as a data processing apparatus. The host 5 is an apparatus or application software that can handle a content that can be recorded to the DVD medium 1 and reproduced therefrom and that is connected to the DVD drive 4. The host 5 is composed of for example application software and a PC in which the application software is installed.

The DVD drive 4 and the host 5 are connected with an interface 4a. The interface 4a is for example ATAPI (AT Attachment with Packet Interface), SCSI (Small Computer System Interface), USB (Universal Serial Bus), IEEE (Institute of Electrical and Electronics Engineers) 1394, or the like.

On the DVD medium 1, a medium ID 11, a medium key block 12, and a ACC (Authentication Control Code) are prerecorded. The ACC is data recorded on the DVD medium 1. The ACC causes the DVD drive 4 and the host 5 to authenticate each other uniquely for each DVD medium 1.

The DVD drive 4 reads an ACC 16 from the DVD medium 1. The ACC 16 that is read from the DVD medium 1 is input to an AKE (Authentication and Key Exchange) 41 of the DVD drive 4. In addition, the ACC 16 is transferred to the host 5. The host 5 inputs the received ACC to an AKE 51. The AKEs 41 and 51 exchange random number data and generates a common session key (referred to as bus key) that varies in each authenticating operation with the exchanged random numbers and the value of the ACC.

The bus key is supplied to MAC (Message Authentication Code) calculating blocks 42 and 52. The MAC calculating blocks 42 and 52 are processes that calculate a medium ID and a MAC of the medium key block 12 with the obtained bus keys as parameters obtained by the AKEs 41 and 51. The host 5 uses the MAC calculating blocks 42 and 52 so as to determine whether or not the MKB and medium ID have integrity.

A comparing portion 53 of the host 5 compares the MACs calculated by the MACs 42 and 52 and determines whether or not they match. When the values of the MACs match, it is confirmed that the MKB and the medium ID have integrity. A switch SW1 is controlled in accordance with the compared output.

The switch SW1 turns on/off a signal path between a recording path or a reproducing path of the DVD medium 1 of the DVD drive 4 and an encrypting/(or) decrypting module 54 of the host 5. The switch SW1 represents on/off of the signal path. Actually, the switch SW1 represents that when the signal path is turned on, the process of the host 5 is continued and that when the signal path is turned off, the process of the host 5 is stopped. The encrypting/decrypting module 54 is a calculating block that calculates a content key with a medium unique key, an encrypted title key, and a CCI, encrypts a content with the content key, obtains an encrypted content 13 or decrypts the encrypted content 13 with the content key.

A medium unique key calculating block 55 is a calculating block that calculates a medium unique key with the MKB 12, the medium ID, and a device key 56. Like the recorder or player shown in FIG. 1, the medium unique key calculating block 55 calculates a medium key with the device key and the MKB 12. The medium unique key calculating block 55 calculates a medium unique key with the medium key and the medium IC 11. When the medium key is a predetermined value, it is determined that the electronic apparatus or application software is not valid. As a result, the electronic apparatus or application software is revoked. Thus, the medium unique key calculating block 55 also functions as a revoke processing portion that revokes the electronic apparatus or application software.

When a content is recorded, if the result of the comparing portion 53 has confirmed integrity, the switch SW1 is turned on. At that point, the encrypted content 13, the encrypted title key 14, and the CCI 15 are supplied from the encrypting/decrypting module 54 to the DVD drive 4 through the switch SW1. As a result, the encrypted content 13, the encrypted title key 14, and the CCI 15 are recorded to the DVD medium 1. When a content is reproduced, if the result of the comparing portion 53 has confirmed integrity, the SW1 is turned on. At that point, the encrypted content 13, the encrypted title key 14, and the CCI 15 reproduced from the DVD medium 1 are supplied to the encrypting/decrypting module 54 through the switch SW1. The encrypting/decrypting module 54 decrypts the encrypted content.

Figure 3:
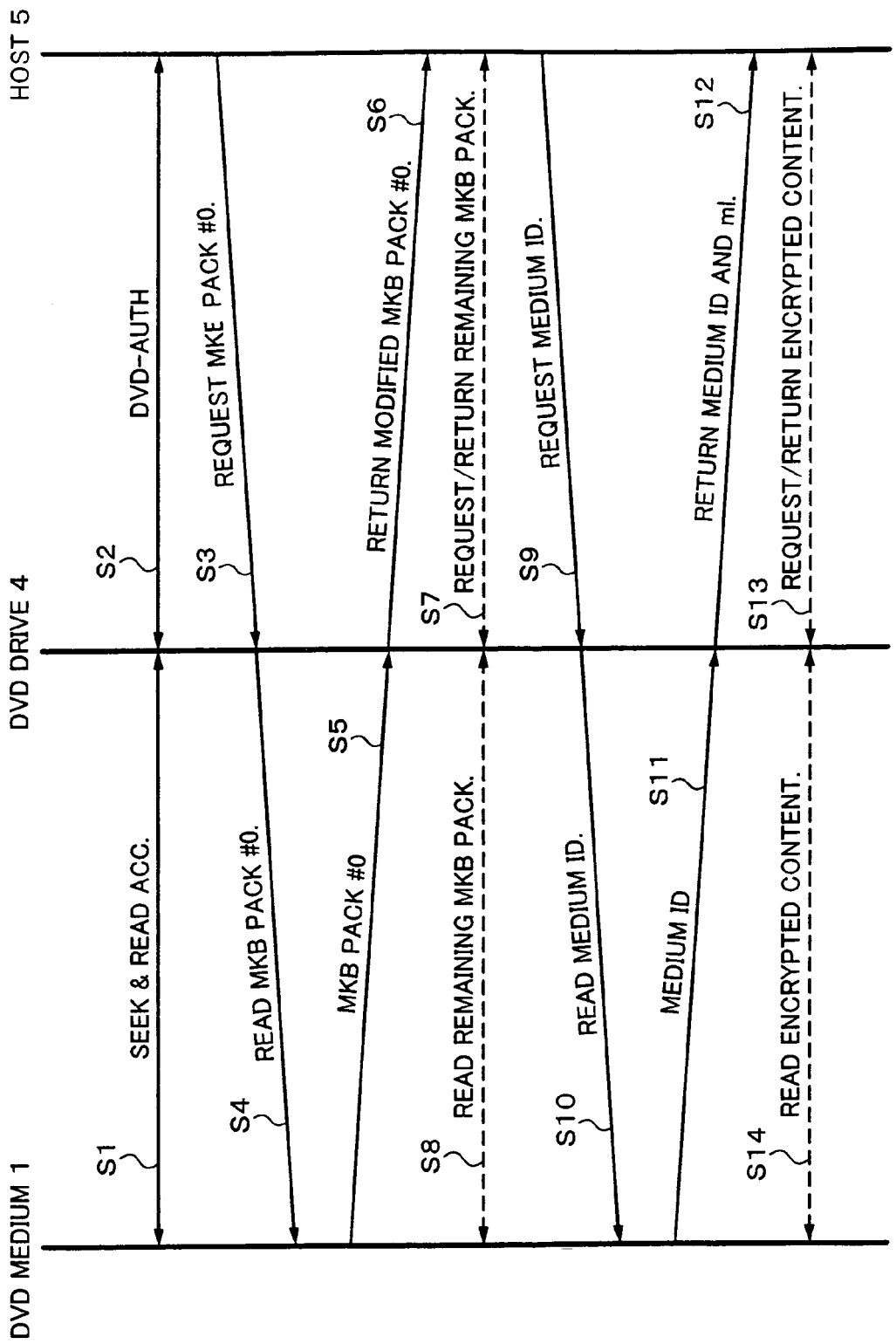
FIG. 3 is a schematic diagram describing processes for a DVD drive 4 and a host 5 of the system shown in FIG. 2.

FIG. 3 shows steps of a process for exchanging signals among the DVD medium 1, the DVD drive 4, and the host 5 in the system using the DVD medium under the conventional PC environment shown in FIG. 2. The host 5 sends a command to the DVD drive 4. The DVD drive 4 performs an operation in accordance with the command.

In response to the command received from the host 5, the ACC of the DVD medium 1 is sought and read (at step S1). At the next step S2, the ACC is input to the AKE 41. In addition, the ACC is transferred to the host 5. In the host 5, the received ACC is input to the AKE 51. The AKEs 41 and 51 exchange random number data. The AKEs 41 and 51 generate a bus key as a session key that varies in each session with the exchanged random numbers and the value of the ACC 16. The bus key is shared by the DVD drive 4 and the host 5. When a mutual authentication has not been successful, the process is stopped.

Whenever the power is turned on or off or the disc is changed, an authenticating operation is performed. When a recording operation is performed with the recording button or a reproducing operation is performed with the play button, an authenticating operation may be performed. For example, when the record button or play button is pressed, an authenticating operation is performed.

When authentication has been successful, at step S3, the host 5 requests the DVD drive 4 to read a MKB (medium key block) pack #0 from the DVD medium 1. MKB pack 0 to pack 15 of 16 sectors are recorded repeatedly 12 times in the lead-in area. The error correction code encoding process is performed in the unit of one pack.

At step S4, the DVD drive 4 reads the MKB pack #0. At step S5, the pack #0 is read. The DVD drive 4 returns a modified MKB to the host 5 (at step S6). When the DVD drive 4 reads an MKB, the DVD drive 4 calculates a MAC value with a bus key as a parameter, adds the MAC value to the MKB, and transfers the resultant data to the host 5. At steps S7 and S8, the requesting operation, the reading operation, and the transferring operation are repeatedly performed for the remaining MKB packs other than the pack #0 namely until for example the pack #15 is read and transferred to the host 5.

The host 5 requests a medium ID of the DVD drive 4. The DVD drive 4 reads the medium ID from the DVD medium 1. At step S11, the medium ID is read. When the DVD drive 4 reads the medium ID from the DVD medium 1, the DVD drive 4 calculates the MAC value with the bus key as a parameter.

At step S12, the DVD drive 4 adds a MAC value m1 to the medium ID and transfers the resultant data to the host 5.

The host 5 calculates the MAC value with parameters of the MKB 12 received from the DVD drive 4 and the bus key received from the medium ID 11. The comparing portion 53 compares the calculated MAC value with the MAC value received from the DVD drive 4. When they match, the host 5 determines that the received MKB and medium ID are valid and turns on the switch SW1 so as to cause the process to advance. In contrast, when they do not match, the host 5 determines that the received MKB and medium ID have been revoked and turns off the switch SW1 so as to cause the process to stop.

At step S13, the host 5 requests an encrypted content of the DVD drive 4. At step S14, the DVD drive 4 reads the encrypted content from the DVD drive 4. At step S13, the encrypted content is transferred to the host 5. The medium unique key calculating block 55 of the host 5 calculates a medium unique key with the device key 56, the MKB 12, and the medium ID 11. The medium unique key is supplied to the encrypting/decrypting module 54. The encrypting/decrypting module 54 obtains a content key with the encrypted title key 14 and the CCI 15. The encrypting/decrypting module 54 decrypts the encrypted content that is read from the DVD medium 1 with the content key. The encrypting/decrypting module 54 encrypts a content that is recorded to the DVD medium 1.

Figure 4:
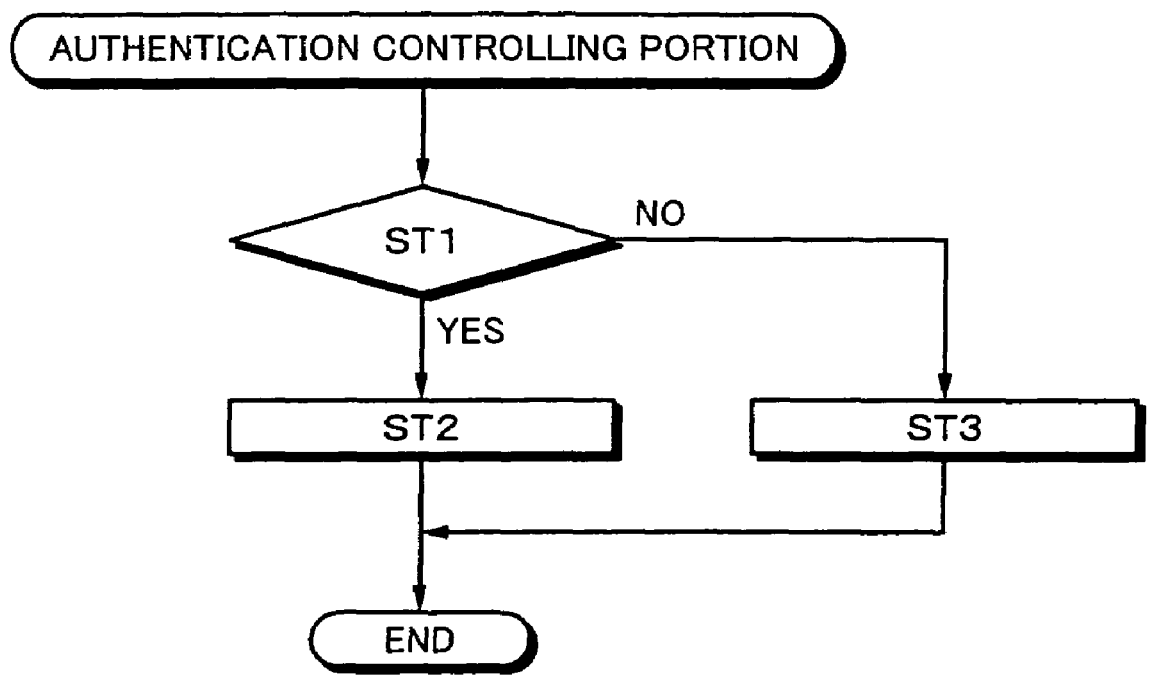
FIG. 4 is a flow chart describing an authenticating operation of the system shown in FIG. 2.

At step ST1 of a flow chart shown in FIG. 4, a MAC calculated value obtained with a bus key as a parameter by the MAC calculating block 42 is compared with a MAC calculated value obtained with a bus key as a parameter by the comparing portion 53. When they match, at step ST2, the switch SW1 is turned on. When they do not match, at step ST3, the switch SW1 is turned off and the process is stopped.

Figure 5:
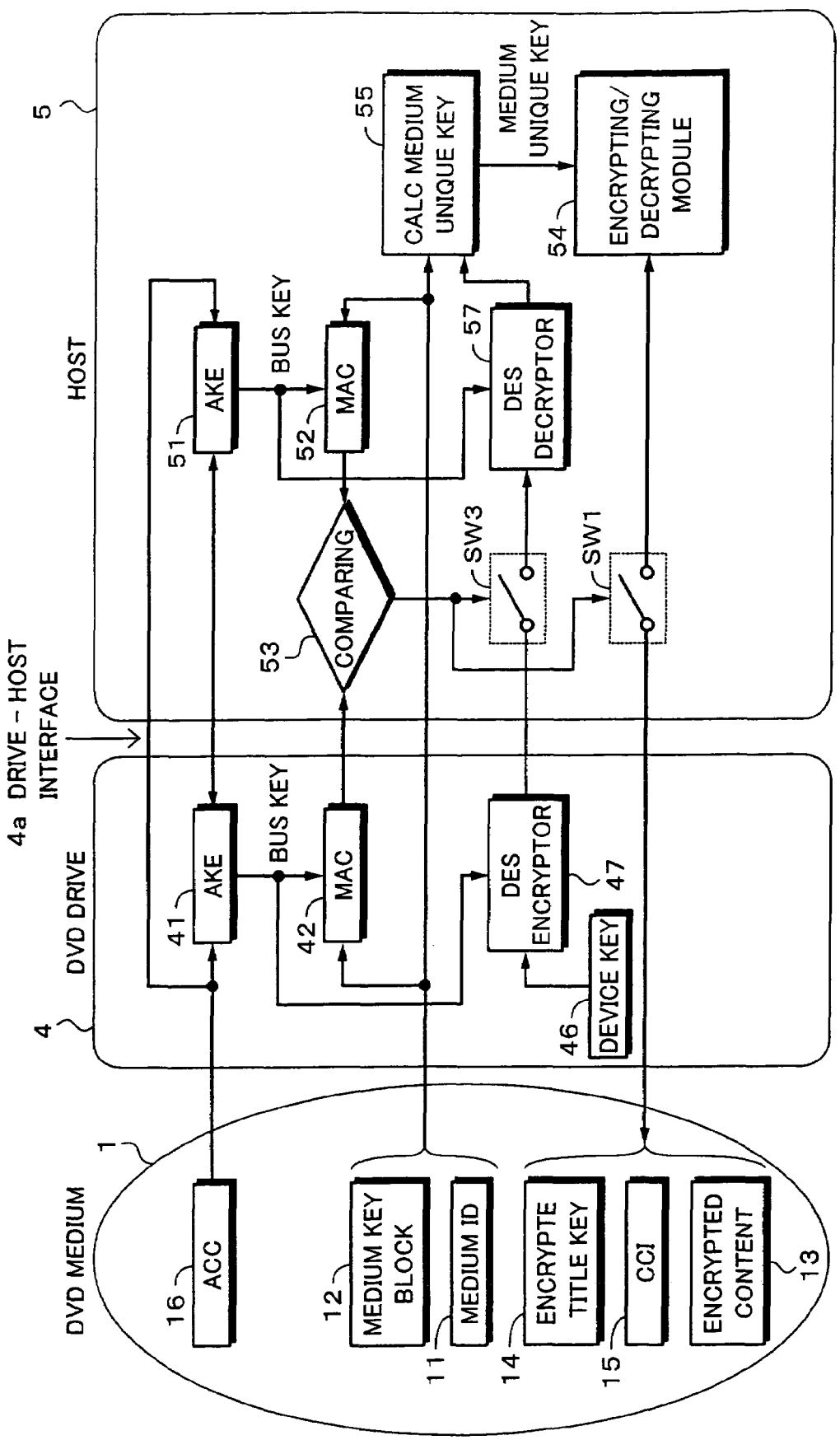
FIG. 5 is a block diagram showing a PC based DVD medium recording and reproducing system according to a first embodiment of the present invention.

FIG. 5 shows a first embodiment of the present invention applied to the PC environment shown in FIG. 2. According to the first embodiment, a device key that is secret information of the host 5 side is stored on the DVD drive 4 side. As described above, the device key is information that is used to perform a revoking operation and obtain a medium key.

In FIG. 5, reference numeral 46 is a device key stored on the DVD drive 4 side. To securely transmit the device key 46 to the host 5, the device key 46 is input to an encrypting portion for example a DES (Data Encryption Standard) encryptor 47. The DES encryptor 47 encrypts the device key 46 with the bus key. The encrypted device key is transferred to the host 5 through a drive-host interface 4a.

The encrypted device key is input to a DES decryptor 57 through a switch SW2 that is turned on only when both MAC values match in a comparing portion 53, namely integrity is confirmed. In FIG. 5, the switch SW2 represents on/off of a signal path. Actually, like the switch SW1, the switch SW2 represents that when the switch SW2 is turned on, the process of the host 5 is continued and that when the switch SW2 is turned off, the process of the host 5 is stopped. A bus key is supplied to the DES decryptor 57. The DES decryptor 57 decrypts the device key.

The decrypted device key is supplied to the medium unique key calculating block 55. The medium unique key calculating block 55 calculates a medium unique key with the MKB 12, the medium ID, and the device key 46. The medium unique key calculating block 55 calculates a medium key with the MKB 12 and the device key 46. The medium unique key calculating block 55 calculates a medium unique key with the medium ID and the medium key. When the medium key calculated by the medium unique key calculating block 55 is a predetermined value, the device key, namely the DVD drive 4 is revoked and the process of the DVD drive 4 is stopped. The medium unique key calculating block 55 has a function of the revoke processing portion.

The medium unique key is supplied to the encrypting/decrypting module 54. The encrypting/decrypting module 54 obtains a content key with the encrypted title key 14 and the CCI 15. The encrypting/decrypting module 54 decrypts an encrypted content that is read from the DVD medium 1 with the content key. The encrypting/decrypting module 54 encrypts a content that is recorded on the DVD medium 1.

Figure 6:
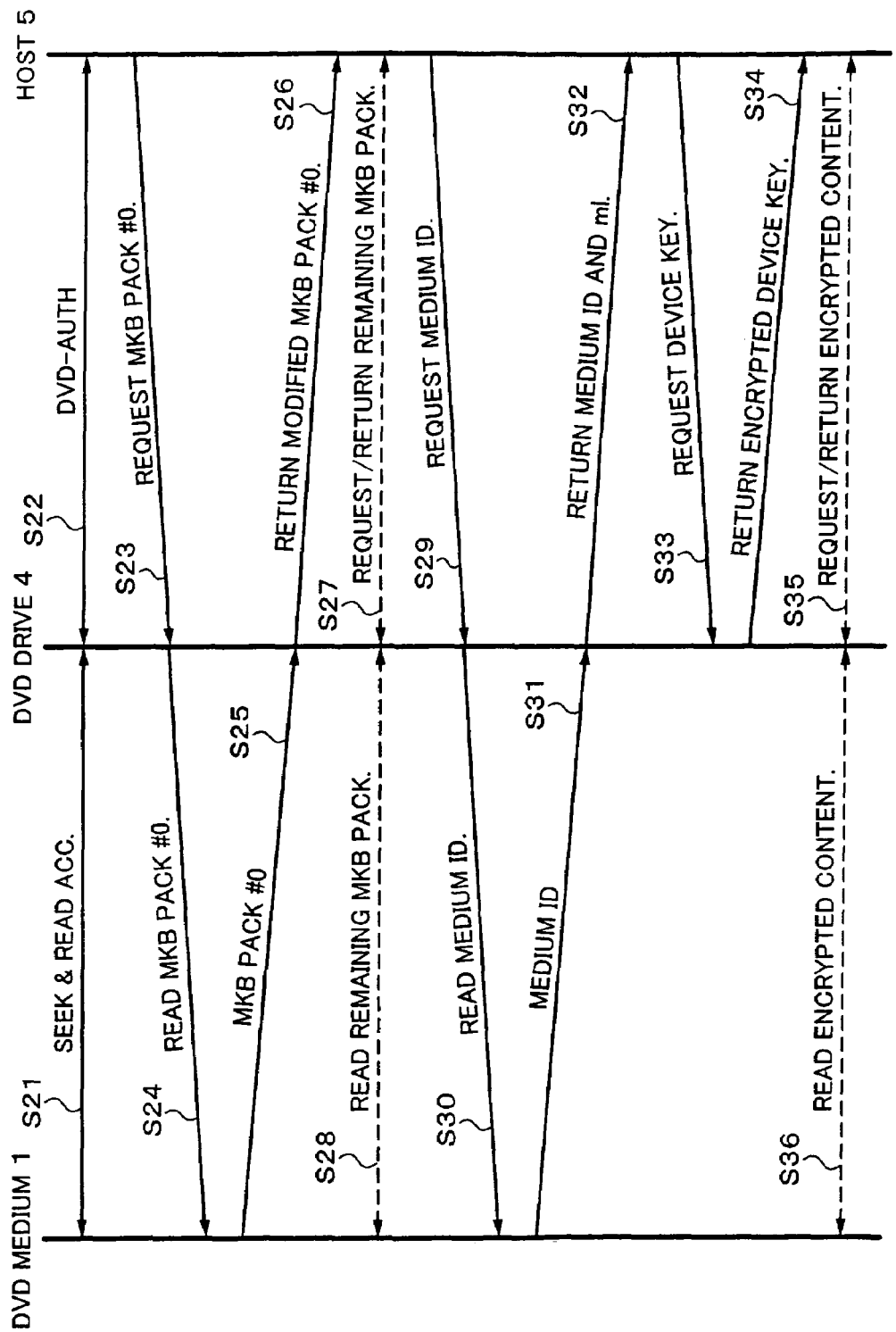
FIG. 6 is a schematic diagram describing processes for a DVD drive 4 and a host 5 according to the first embodiment of the present invention.

FIG. 6 shows steps of a process according to the first embodiment. Since a process for seeking and reading an ACC (at step S21) to a process for returning a medium ID and an m1 (at step S32) are the same as those shown in FIG. 3, their processes will be described in brief. At step S21, an ACC is sought and read. At step S22, when authentication has been successful, a bus key as a session key varies in each authentication is generated.

At step S23, the host 5 requests the DVD drive 4 to read an MKB (Medium Key Block) pack #0. At step S24, the DVD drive 4 reads the MKB pack #0. At step S25, the pack #0 is read. When the DVD drive 4 reads the MKB, the DVD drive 4 calculates a MAC value with a bus key as a parameter and returns data of which the MAC value is added to the MKB (modified MKB) to the host 5 at step S26. At steps S27 and S28, the requesting operation, the reading operation, and the transferring operation are performed for a remaining MKB pack other than the pack #0.

The host 5 requests a medium ID of the DVD drive 4 (at step S29). The DVD drive 4 reads the medium ID (at step S30). At step S31, the medium ID is read. When the DVD drive 4 reads the medium ID, the DVD drive 4 calculates the MAC value with the bus key as a parameter. At step S32, the DVD drive 4 adds an MAC value m1 to the medium ID and transfers the resultant data to the host 5.

The host 5 calculates a MAC value once again with the MKB 12 and the medium ID 11 received from the DVD drive 4 and the bus key as parameters. When the calculated MAC value matches the MAC value received from the DVD drive 4, the host 5 determines that the received MKB and medium ID are valid and turns on the switch SW1 so as to causes the process to advance. In contrast, when they do not match, the host 5 determines that the received MKB and medium ID were tampered and turns off the switch SW1 so as to cause the process to stop.

At step S33, the host 5 requests a device key of the DVD drive 4. The DVD drive 4 causes the DES encryptor 47 to encrypt the device key 46 and sends the encrypted device key to the host 5 (at step S34). The host 5 causes the DES decryptor 57 to decrypt the device key with the bus key.

At step S35, the host 5 requests an encrypted content of the DVD drive 4. At step S36, the DVD drive 4 reads the encrypted content. At step S35, the DVD drive 4 transfers the encrypted content to the host 5. The medium unique key calculating block 55 of the host 5 calculates a medium unique key with the device key 46, the MKB 12, and the medium ID 11. The medium unique key is supplied to the encrypting/decrypting module 54. The encrypting/decrypting module 54 decrypts the encrypted content. The encrypting/decrypting module 54 encrypts a content that is recorded on the DVD medium 1.

According to the foregoing first embodiment, a device key that is secret information of a copyright protection technology is implemented in the DVD drive 4. For example, a device key is implemented in an LSI (Large Scale Integrated Circuit) such as a flash memory. Thus, the device key in the LSI cannot be read from the outside of the DVD drive 4. As a result, application software installed to the host 5 does not need to have the secret information of the copyright protection technology. Thus, since the software can withstand an analysis using reverse engineering, the safety of the copyright protection technology can be secured.

To allow a drive to validly deal with the DVD medium 1, the drive requires the secret information of the copyright protection technology. Thus, as an effect of the present embodiment, a clone drive that pretends to be a valid drive without having a valid license can be prevented from being produced.

Figure 7:
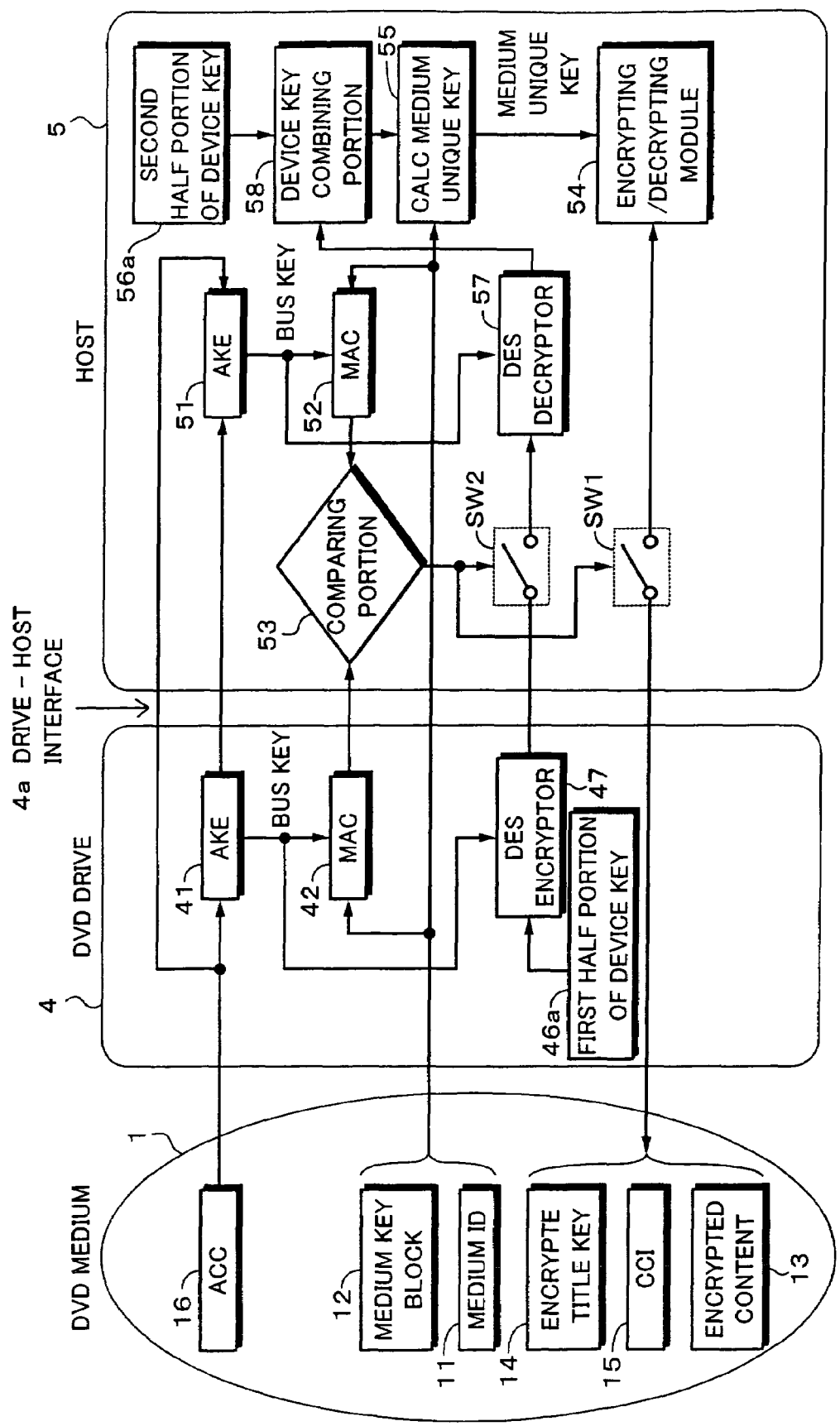
FIG. 7 is a block diagram showing a PC based DVD medium recording and reproducing apparatus according to a second embodiment of the present invention.

FIG. 7 shows a second embodiment of the present invention applied to a PC environment. According to the second embodiment, a device key as secret information on the host 5 side is divided into two elements one of which is stored on the DVD drive 4 side.

In FIG. 7, reference numeral 46*a* represents a first half portion of a device key stored on the DVD drive 4 side. The first half portion of the device key is a part of the device key that becomes a complete device key when the first half portion is combined with a second half portion of the device key. The first half portion 46*a* of the device key is input to an encrypting portion for example a DES encryptor 47. The DES encryptor 47 encrypts the first half portion 46*a* with a bus key. The first half portion of the encrypted device key is transferred to the host 5 through a drive-host interface 4*a*.

The first half portion of the encrypted device key is input to a DES decryptor 57 through a switch SW2 that is turned on only when a match of MAC values has been detected by a comparing portion 53. The bus key is supplied to a DES decryptor 57. The DES decryptor 57 decrypts the first half portion of the device key.

Reference numeral 56*a* represents a second half portion of the device key. The first half portion 46*a* and the second half portion 56*a* decrypted by the DES decryptor 57 are input to a device key combining portion 58. When the first half portion 46*a* and the second half portion 56*a*. are combined by the device key combining portion 58, the device key is obtained.

The obtained device key is supplied to a medium unique key calculating block 55. The medium unique key calculating block 55 calculates a medium unique key with an MKB 12, a medium ID, and a device key 46. The medium unique key is supplied to a encrypting/decrypting module 54. The encrypting/decrypting module 54 obtains a content key with an encrypted title key 14 and a CCI 15. The encrypting/decrypting module 54 decrypts an encrypted content that is read from the DVD medium 1 with the content key. The encrypting/decrypting module 54 encrypts a content that is recorded on the DVD medium 1.

The second embodiment is the same as the first embodiment except that a device key is divided into two elements. Thus, the process of the second embodiment is the same as that shown in FIG. 6. Thus, the illustration of the process of the second embodiment is omitted.

According to the second embodiment, as data of a copyright protection technology, a part of a device key is implemented in the drive 4. For example, a part of a device key is implemented in an LSI. As a result, an application that is installed in the host 5 needs to have only a part of data of the copyright protection technology. Consequently, the software can withstand against an analysis using reverse engineering. Thus, the safety of the copyright protection technology can be secured.

To allow a drive to validly deal with the DVD medium 1, it needs to have secret information of the copyright protection technology such as a device key. Thus, as an effect of the present embodiment, a clone drive that pretends to be as a valid drive without having a valid license can be prevented from being produced. Only when both the first half portion 46*a* and the second half portion 56*a* of the device key are valid, it is determined that the electronic apparatus or application software are valid. Thus, a revoking process can be performed for both the DVD drive 4 and the host 5.

Figure 8:
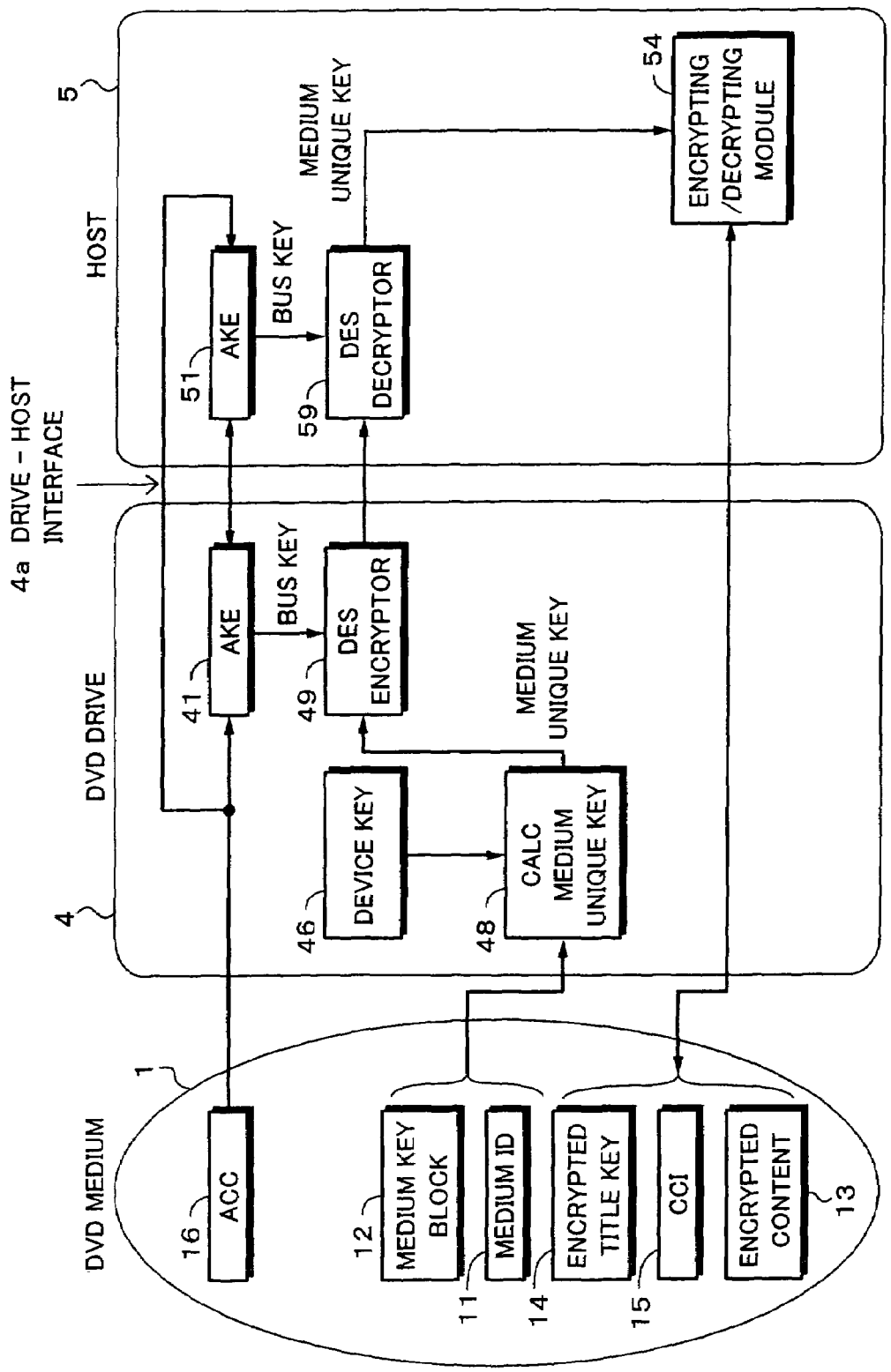
FIG. 8 is a block diagram showing a PC based DVD medium recording and reproducing system according to a third embodiment of the present invention.

FIG. 8 shows a third embodiment of the present invention. According to the third embodiment, a DVD drive 4 has a device key 46. The DVD drive 4 has a medium unique key calculating block represented by reference numeral 48.

According to the third embodiment, since the DVD drive 4 has a medium unique key calculating block 48, the DVD drive 4 does not need to transfer an MKB and a medium ID reproduced from a DVD medium 1 to a host 5. As a result, an MAC calculating block, a comparing portion that compares calculated MAC values, and a switch that is controlled in accordance with a compared output are omitted. In addition, a revoking process can be performed by only the DVD medium 1 and the DVD drive 4 without the host 5.

The medium unique key calculating block 48 of the DVD drive 4 calculates a medium unique key with a MKB 12, a medium ID, and a device key 46. The medium unique key calculating block 48 calculates a medium key with the MKB 12 and the device key 46. In addition, the medium unique key calculating block 48 calculates a medium unique key with the medium ID 11 and the medium key. To securely transfer the medium unique key to the host 5, the medium unique key is supplied to a DES encryptor 49. The DES encryptor 49 encrypts the medium unique key with a bus key. The encrypted medium unique key is supplied to a DES decryptor 59 of the host 5. The DES decryptor 59 decrypts the encrypted medium unique key with a bus key.

The decrypted medium unique key is supplied to an encrypting/decrypting module 54. The encrypting/decrypting module 54 obtains a content key with an encrypted title key 14 and a CCI 15. The encrypting/decrypting module 54 decrypts an encrypted content that is read from the DVD medium 1 with the content key. In addition, the encrypting/decrypting module 54 encrypts a content that is recorded to the DVD medium 1.

Figure 9:
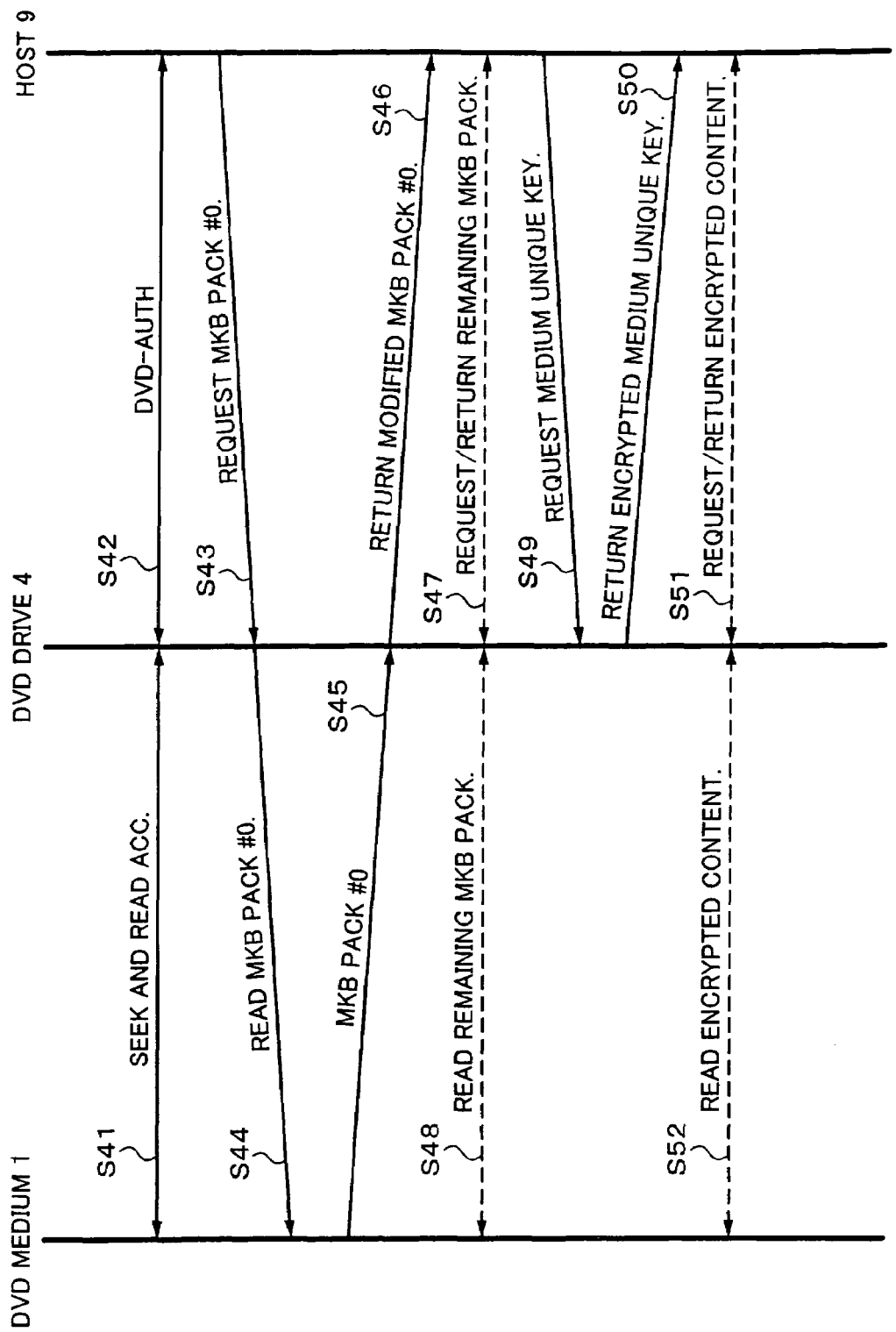
FIG. 9 is a schematic diagram describing processes for a DVD drive 4 and a host 5 according to the third embodiment of the present invention.

FIG. 9 shows steps of a process according to the third embodiment. A step for seeking and reading an ACC (at step S41) to a step for reading a remaining MKB pack (at step S48) are the same as those shown in FIG. 3. Thus, these steps will be described in brief.

At step S42, authentication is performed. When the authentication has been successful, a bus key is generated as a session key that varies in each authenticating operation. At step S43, the host 5 requests the DVD drive 4 to read an MKB (Medium Key Block) pack #0. At step S44, the DVD drive 4 reads the MKB pack #0. At step S45, the pack #0 is read. When the DVD drive 4 reads the MKB, the DVD drive 4 calculates a MAC value with a bus key as a parameter and transfers data of which the MAC value is added to the MKB to the host 5 at step S46. At steps S47 and S48, the requesting operation, the reading operation, and the transferring operation are performed for a remaining MKB pack other than pack #0.

At step S49, the host 5 requests a medium unique key at step S49 of the DVD drive 4. The DVD drive 4 sends an encrypted medium unique key to the host 5 (at step S50). The medium unique key is supplied to the encrypting/decrypting module 54. When the host 5 requests an encrypted content of the DVD drive 4 at step S51, the DVD drive 4 reads an encrypted content (at step S52). The encrypting/decrypting module 54 decrypts the encrypted content. The encrypting/decrypting module 54 encrypts a content that is recoded to the DVD medium 1.

Figure 10:
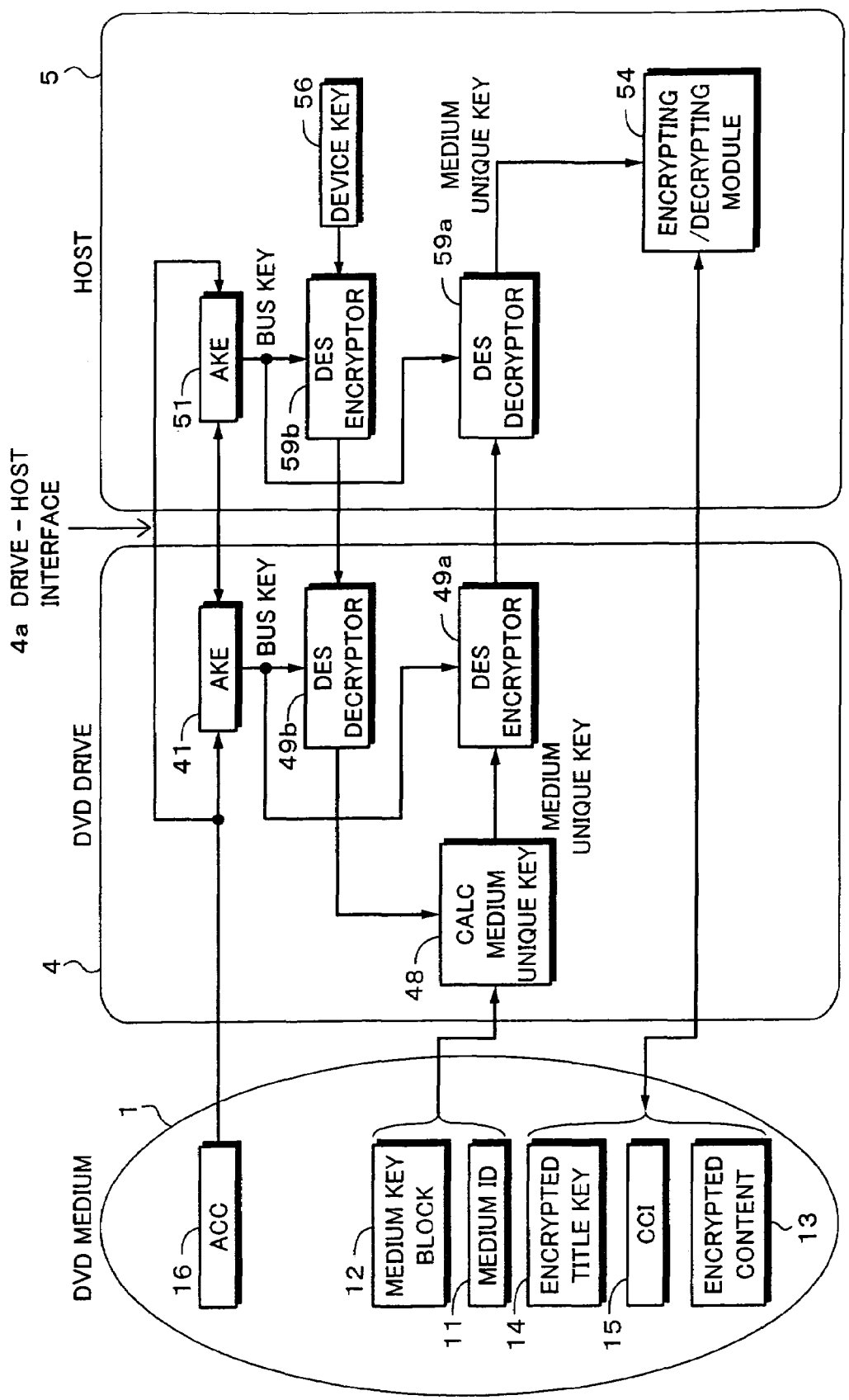
FIG. 10 is a block diagram showing a PC based DVD medium recording and reproducing system according to a fourth embodiment of the present invention.

FIG. 10 shows a fourth embodiment of the present invention. Like the third embodiment, according to the fourth embodiment of the present invention, a DVD drive 4 has a medium unique key calculating block 48. A host 5 has a device key 56. The device key 56 is securely transferred from the host 5 to the DVD drive 4.

According to the fourth embodiment, since the DVD drive 4 has a medium unique key calculating block 48, the DVD drive 4 does not need to transfer an MKB and a medium ID reproduced from a DVD medium 1 to the host 5. As a result, an MAC calculating block, a comparing portion that compares calculated MAC values, and a switch controlled in accordance with the compared output are omitted.

A device key 56 of the host 5 is supplied to a DES encryptor 59*b*. The DES encryptor 59*b* encrypts the device key 56 with a bus key. The encrypted device key is transferred to a DES decryptor 49*b* of the DVD drive 4. The DVD drive 4 decrypts the device key. The decrypted device key is input to a medium unique key calculating block 48.

The medium unique key calculating block 48 of the DVD drive 4 calculates a medium unique key with the MKB 12, the medium ID, and the device key 46. In other words, the medium unique key calculating block 48 calculates a medium key with the MKB 12 and the device key 46. The medium unique key calculating block 48 calculates the medium unique key with the medium ID 11 and the medium key. The medium unique key is supplied to a DES encryptor 49*a*. The DES encryptor 49*a* encrypts the medium unique key with the bus key. The encrypted medium unique key is supplied to a DES decryptor 59*a* of the host 5. The DES decryptor 59*a* decrypts the encrypted medium unique key with the bus key.

The decrypted medium unique key is supplied to the encrypting/decrypting module 54. The encrypting/decrypting module 54 obtains a content key with an encrypted title key 14 and a CCI 15. The encrypting/decrypting module 54 decrypts an encrypted content that is read from the DVD medium 1 with the content key. The encrypting/decrypting module 54 encrypts a content that is recorded to the DVD medium 1.

Figure 11:
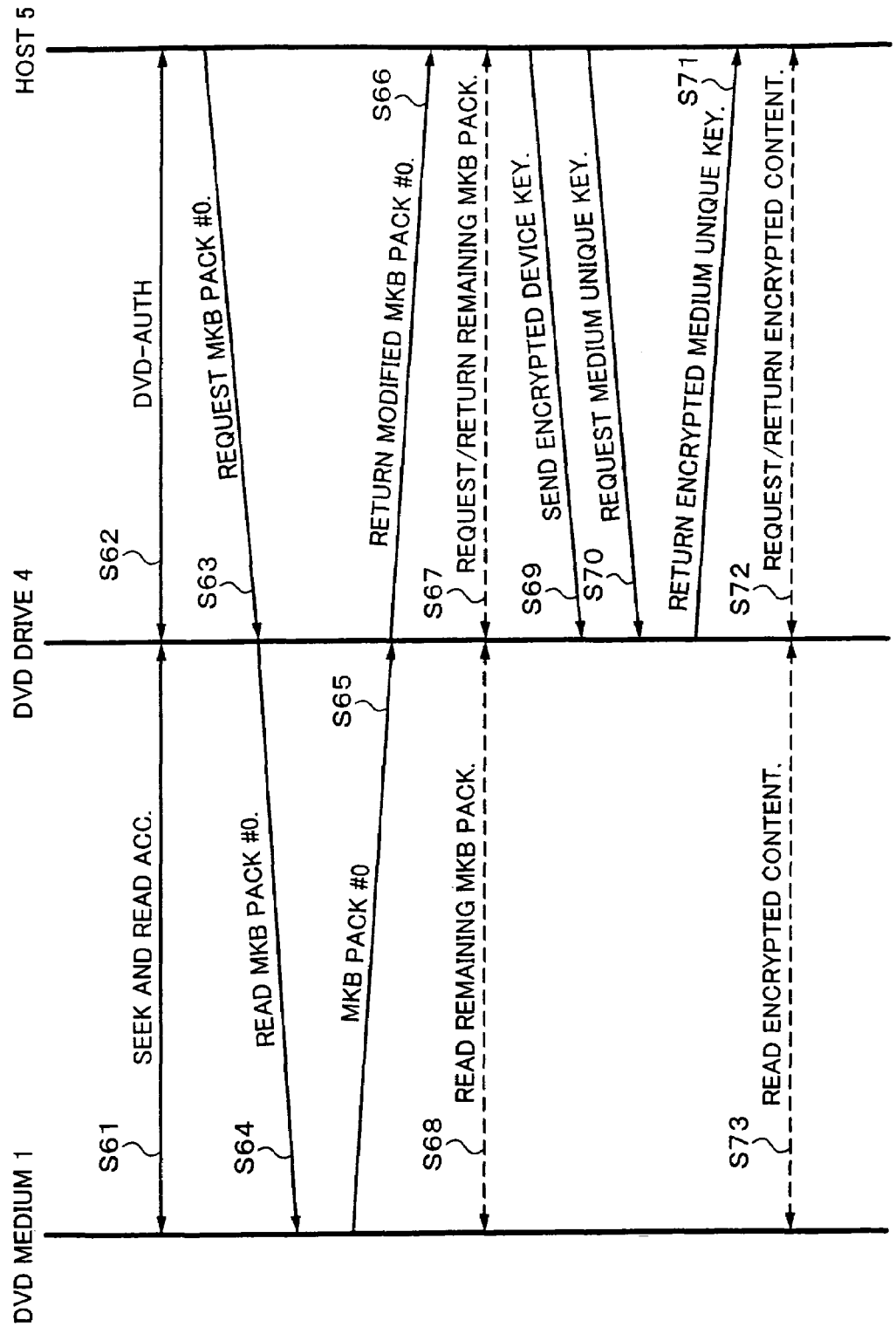
FIG. 11 is a schematic diagram describing processes for a DVD drive 4 and a host 5 of the fourth embodiment of the present invention.

FIG. 11 shows steps of a process according to the fourth embodiment. A step for seeking and reading an ACC (at step S61) to a step for reading a remaining MKB (at step S68) are the same as those shown in FIG. 3. Thus, these steps will be described in brief.

At step S62, authentication is performed. When the authentication has been successful, a bus key as a session key that varies in each authenticating operation is generated. Thereafter, at step S63, the host 5 requests the DVD drive 4 to read an MKB (Medium Key Block) pack #0. At step S64, the DVD drive 4 reads the MKB pack #0. At step S65, the pack #0 is read. When the DVD drive 4 reads the MKB, the DVD drive 4 calculates an MAC value with a bus key as a parameter and transfers data of which the MAC value is added to the MKB to the host 5. At steps S67 and S68, the requesting operation, the reading operation, and the transferring operation are performed for a remaining MKB pack other than the pack #0.

At step S69, the host 5 sends an encrypted device key to the DVD drive 4. The DVD drive 4 calculates a medium unique key. At step S70, the host 5 requests a medium unique key. The DVD drive 4 sends an encrypted medium unique key to the host 5 (at step S71). The medium unique key is supplied to the encrypting/decrypting module 54. When the host 5 requests an encrypted content of the DVD drive 4 at step 72, the DVD drive 4 reads an encrypted content (at step S73). The encrypting/decrypting module 54 decrypts the encrypted content. The encrypting/decrypting module 54 encrypts a content that is recorded to the DVD medium 1.

According to the foregoing third and fourth embodiments, a part of the algorithm of the copyright protection technology for example a calculating portion for a medium unique key is implemented in the drive 4. For example, the medium unique key calculating block 48 is implemented in an LSI. An application that is installed to the host 5 needs to have only a part of the algorithm of the copyright protection technology. Thus, the software can withstand an analysis using reverse engineering. As a result, the safety of the copyright protection technology can be secured.

According to the third embodiment, to allow a drive to validly deal with the DVD medium 1, the drive needs to have secret information of the copyright protection technology such as a device key. As a result, a clone drive that pretends to be valid drive without having a valid license can be prevented from being produced.

Figure 12:
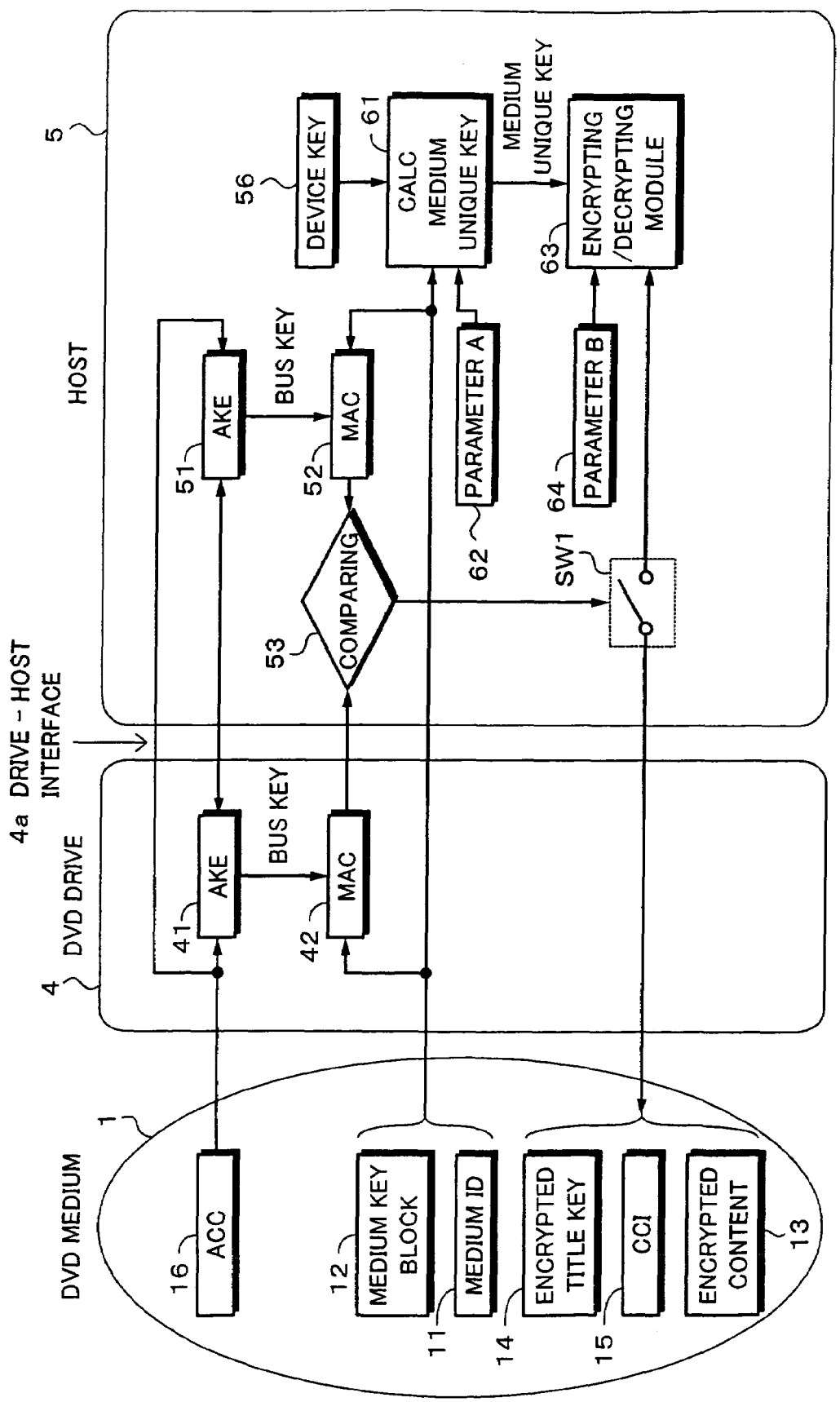
FIG. 12 is a block diagram showing a PC based DVD medium recording and reproducing system according to a fifth embodiment of the present invention.

FIG. 12 shows a fifth embodiment of the present invention. According to the foregoing first to fourth embodiments, the present invention is applied to the CPRM, which is a copyright protection technology for DVDs. In contrast, the fifth embodiment has an extended structure of the architecture of the CPRM shown in FIG. 2.

According to the fifth embodiment, a medium unique key calculating block 61 of a host 5 is operated in accordance with a parameter A 62. In addition, an encrypting/decrypting module 63 is operated in accordance with a parameter B 64. The parameter A 62 and the parameter B 64 may be fixed values or data that is read from a DVD medium 1.

In the conventional CPRM, a medium key is calculated with an MKB and a device key. A medium unique key is calculated with the medium key and a medium ID. In a system of which the CPRM is extended, these calculations are preformed in accordance with the parameter A 62. The encrypting/decrypting module 63 calculates a content key in accordance with the parameter B 64. The process according to the fifth embodiment is the same as that of the conventional CPRM. Thus, the illustration of the process according to the fifth embodiment is omitted.

Figure 13:
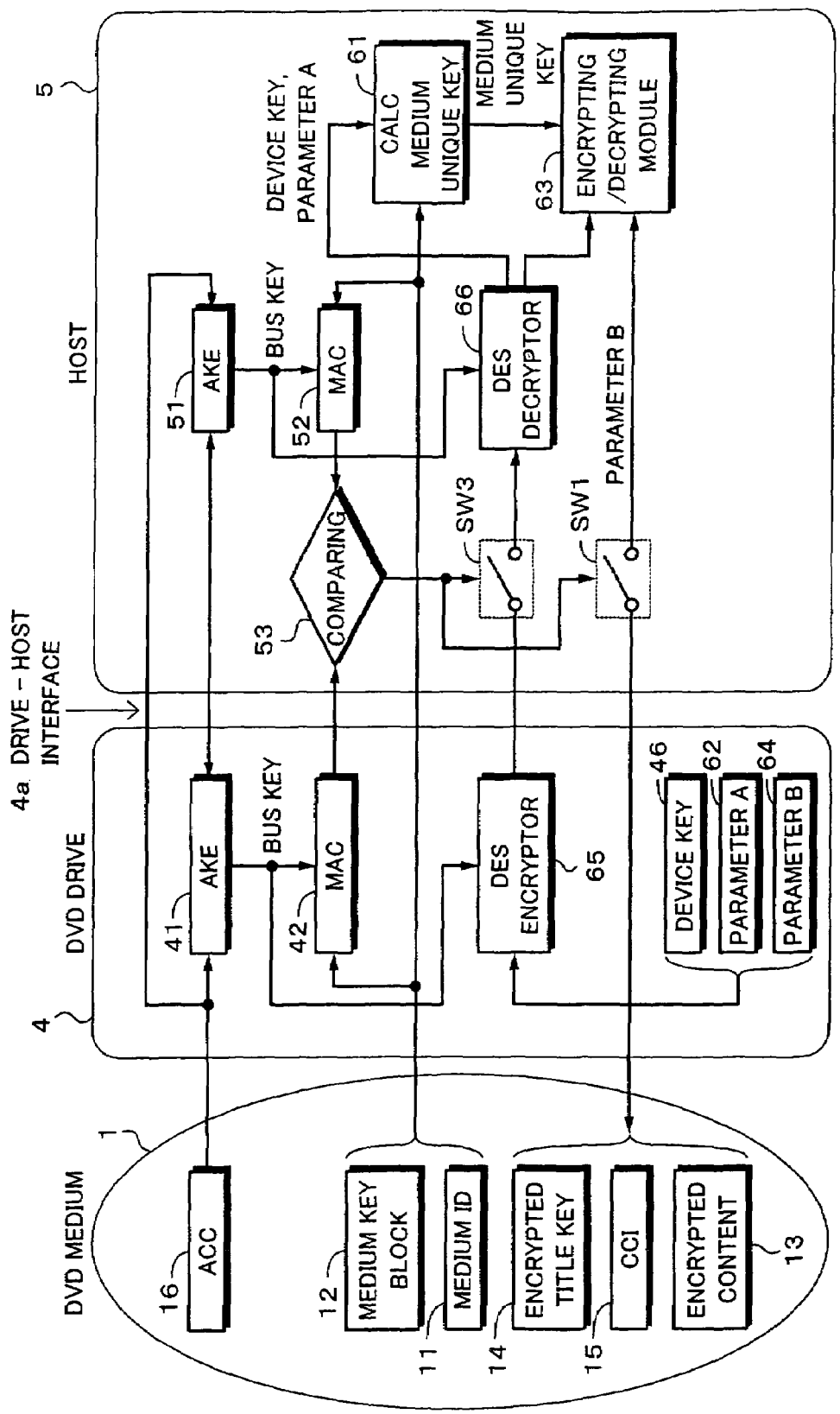
FIG. 13 is a block diagram showing a PC based DVD medium recording and reproducing system according to a sixth embodiment of the present invention.

FIG. 13 shows a sixth embodiment of the present invention. The sixth embodiment has an extended structure of the architecture of the conventional CPRM. A DVD driver 4 has a device key 46, a parameter A 62, and a parameter B 64. To securely transfer the device key 46, the parameter A 62, and the parameter B 64 to the host 5, a DES encryptor 65 encrypts these information with a bus key.

Encrypted data is input to a DES decryptor 66 through a switch SW3 that is turned on when a match of MAC values has been detected by a comparing portion 53 namely, integrity has been confirmed. A bus key is supplied to a DES decryptor 66. The DES decryptor 66 decrypts the device key, the parameter A 62, and the parameter B 64. The decrypted device key and parameter A are supplied to a medium unique key calculating block 61. The medium unique key calculating block 61 calculates a medium unique key with the MKB 12, the medium ID, the device key 46, and the parameter A.

The medium unique key and the parameter B are supplied to an encrypting/decrypting module 63. The encrypting/decrypting module 63 obtains a content key with these data. The encrypting/decrypting module 63 encrypts/decrypts a content with the content key.

Figure 14:
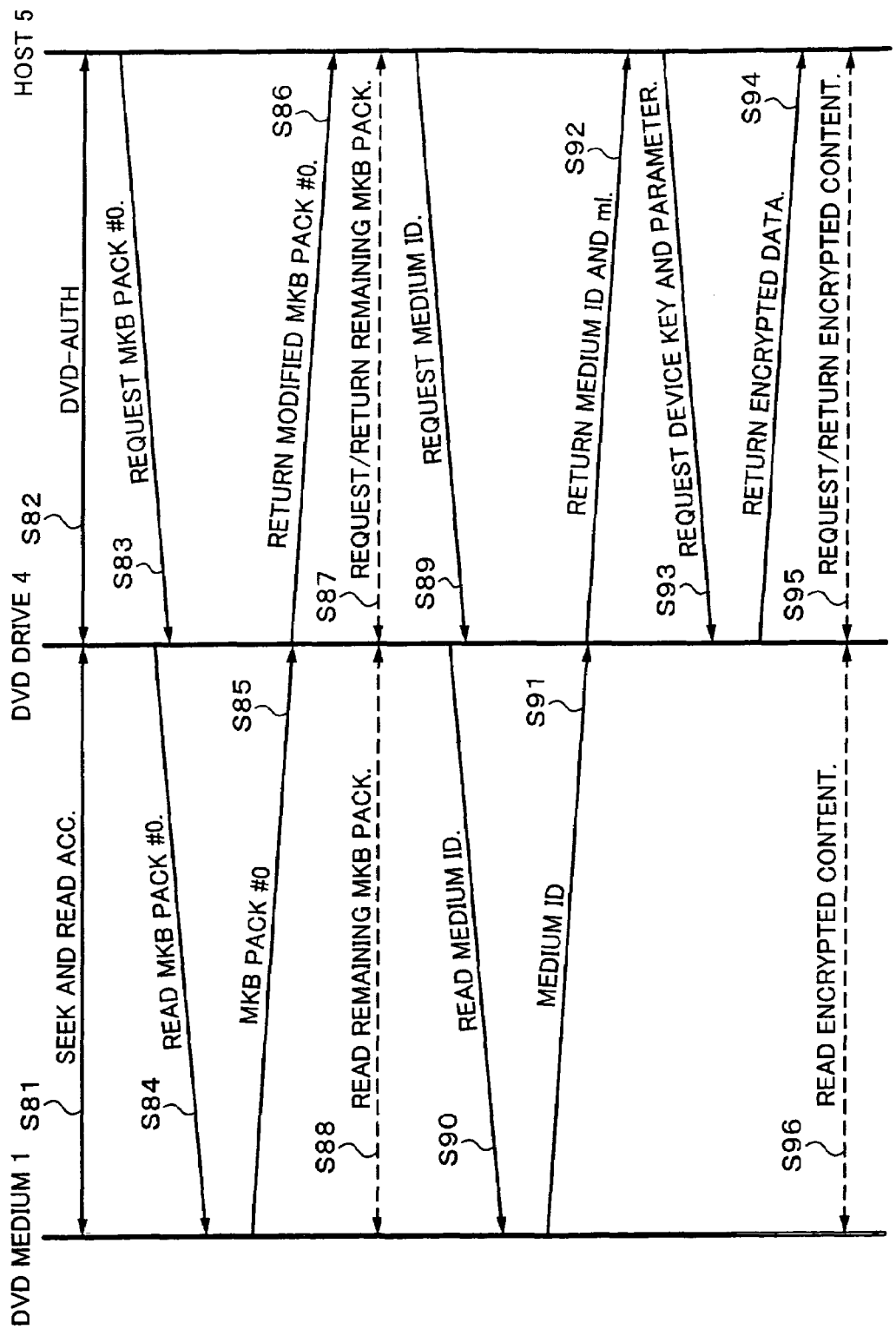
FIG. 14 is a schematic diagram describing processes for a DVD drive 4 and a host 5 according to the sixth embodiment of the present invention.

FIG. 14 shows steps of a process according to the sixth embodiment. A step for seeking and reading an ACC (at step S81) to a step for returning a medium ID and an m1 (at step S92) are the same as those of the conventional CPRM. Thus, these steps will be described in brief. At step S81, an ACC is sought and read. At step S82, when authentication has been successful, a bus key as a session key that varies in each authenticating operation is generated.

At step S83, the host 5 requests the DVD drive 4 to read an MKB (Medium Key Block) pack #0. At step S84, the DVD drive 4 reads the MKB pack #0. At step S85, the pack #0 is read. When the DVD drive 4 reads the MKB, the DVD drive 4 calculates a MAC value with a bus key as a parameter and returns data of which the MAC value is added to the MKB (modified MKB) to the host 5 at step S86. At steps S87 and S88, the requesting operation, the reading operation, and the transferring operation are performed for a remaining MKB pack other than the pack #0.

The host 5 requests a medium ID of the DVD drive 4 (at step S89). The DVD drive 4 reads the medium ID (at step S90). At step S91, the medium ID is read. When the DVD drive 4 reads the medium ID, the DVD drive 4 calculates a MAC value with a bus key as a parameter. At step S92, the DVD drive 4 adds a MAC value m1 to the medium ID and transfers the resultant data to the host 5.

The host 5 calculates a MAC value with the MKB 12 and the medium ID 11 received from the DVD drive 4 and the bus key as a parameter once again. When the calculated MAC value matches the received MAC value, the host 5 determines that the received MKB and medium ID are valid and turns on switches SW1 and SW3 so as to cause the process to advance. In contrast, when they do not match, the host 5 determines that the received MKB and medium ID have been tampered and turns off the switches SW1 and SW3 so as to cause the process to stop.

At step S93, the host 5 requests a device key, a parameter A, and a parameter B of the DVD drive 4. The DES encryptor 65 of the DVD drive 4 encrypts the device key 46, the parameter A, and the parameter B and sends the encrypted data to the host 5 (at step S94). The DES decryptor 66 of the host 5 decrypts the device key with the bus key.

At step S95, the host 5 requests an encrypted content of the DVD drive 4. At step S96, the DVD drive 4 reads an encrypted content. At step S95, the encrypted content is transferred to the host 5. The medium unique key calculating block 61 of the host 5 calculates a medium unique key with the device key 46, the MKB 12, the medium ID 11, and the parameter A. The medium unique key is supplied to the encrypting/decrypting module 63. The encrypting/decrypting module 63 decrypts an encrypted content. The encrypting/decrypting module 63 encrypts a content that is recorded to the DVD medium 1.

Figure 15:
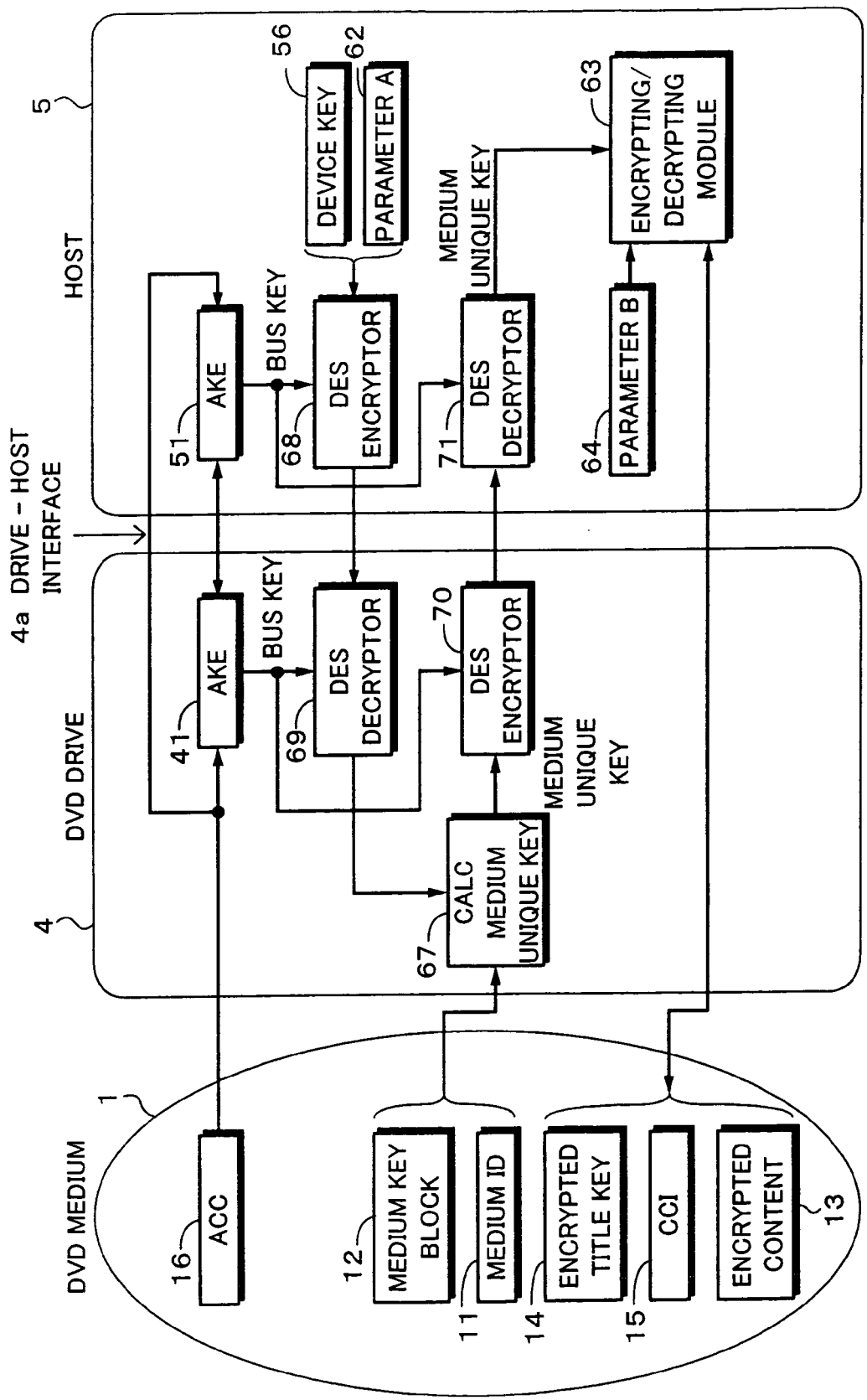
FIG. 15 is a block diagram showing a PC based DVD medium recording and reproducing system according to a seventh embodiment of the present invention.

FIG. 15 shows a seventh embodiment of the present invention. According to the seventh embodiment, a DVD drive 4 has a medium unique key calculating block 67. A host 5 has a device key 56, a parameter A 62, and a parameter B 64. The device key 56 and the parameter A 62 are securely transferred from the host 5 to the DVD drive 4.

According to the seventh embodiment, since the DVD drive 4 has the medium unique key calculating block 67, the DVD drive 4 does not need to transfer an MKB and a medium ID reproduced from the DVD medium 1 to the host 5. As a result, an MAC calculating block, a comparing portion that compares calculated MAC values, and a switch controlled in accordance with the compared result are omitted.

The device key 56 and the parameter A 62 of the host 5 are supplied to a DES encryptor 68. The DES encryptor 68 encrypts the device key 56 and the parameter A 62 with a bus key. The encrypted data is transferred to a DES decryptor 69 of the DVD drive 4. The DES decryptor 69 decrypts the device key and the parameter A. The decrypted device key and parameter A are input to the medium unique key calculating block 67.

The medium unique key calculating block 67 of the DVD drive 4 calculates a medium unique key with the MKB 12, the medium ID, the device key 46, and the parameter A. The medium unique key is supplied to a DES encryptor 70. The DES encryptor 70 encrypts the medium unique key with a bus key. The encrypted medium unique key is supplied to a DES decryptor 71 of the host 5. The DES decryptor 71 decrypts the encrypted medium unique key with the bus key.

The decrypted medium unique key is supplied to an encrypting/decrypting module 63. The encrypting/decrypting module 63 obtains a content key with the encrypted title key 14, the CCI 15, and the parameter A. The encrypting/decrypting module 63 decrypts an encrypted content that is read from the DVD medium 1 with the content key. The encrypting/decrypting module 63 encrypts a content that is recorded to the DVD medium 1.

Figure 16:
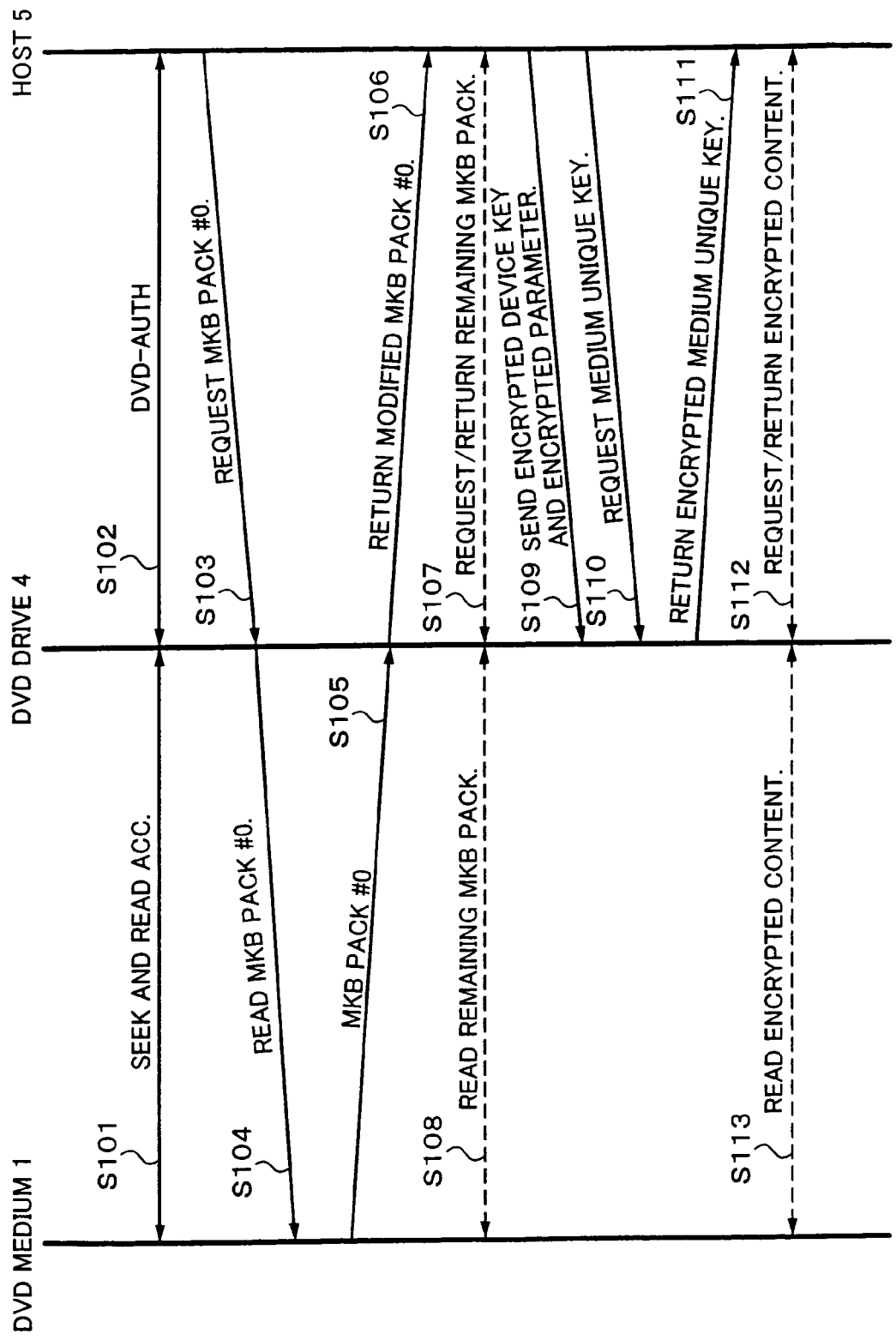
FIG. 16 is a schematic diagram describing processes for a DVD drive 4 and host 5 according to the seventh embodiment of the present invention.

FIG. 16 shows steps of a process according to the seventh embodiment. A step for seeking and reading an ACC (at step S101) to a step for reading a remaining MKB pack (at step S108) are the same as those of the process of the conventional CPRM. Thus, these steps will be described in brief.

At step S102, authentication is performed. When the authentication has been successful, a bus key as a session key that varies in each authenticating operation is generated. At step S103, the host 5 requests the DVD drive 4 to read an MKB (Medium Key Block) pack #0. At step S104, the DVD drive 4 reads the MKB pack #0. At step S105, the pack #0 is read. When the DVD drive 4 reads the MKB, the DVD drive 4 calculates an MAC value with a bus key as a parameter and transfers data of which the MAC value is added to the MKB to the host 5 at step S106. At steps S107 and S108, the requesting process, the reading process, and the transferring process are performed for a remaining MKB pack other than the pack #0.

At step S109, the host 5 sends an encrypted device key and an encrypted parameter to the DVD drive 4. At step S110, the host 5 requests a medium unique key of the DVD drive 4. The DVD drive 4 calculates a medium unique key. At step S111, the DVD drive 4 sends the encrypted medium unique key to the host 5. The medium unique key is supplied to the encrypting/decrypting module 63. When the host 5 requests an encrypted content of the DVD drive 4 at step S112, the DVD drive 4 reads the encrypted content (at step S113). The encrypting/decrypting module 63 decrypts the encrypted content. The encrypting/decrypting module 63 encrypts a content that is recorded to the DVD medium 1.

Next, with reference to FIG. 17, an eighth embodiment of the present invention will be described. Like the foregoing third embodiment (see FIG. 8), according to the eighth embodiment, a medium unique key is generated by a drive. In addition, like the fifth embodiment (see FIG. 12), the sixth embodiment (see FIG. 13), and the seventh embodiment (see FIG. 15), a content key is generated in accordance with a parameter B (extended CPRM system).

In the CPRM extended system, parameters A and B are used so as to calculate a medium unique key and perform encrypting/decrypting operations. These parameters may be stored on the host side or the drive side. Alternatively, the parameters may be recorded on a medium and read by the host. When the parameters A and B are exchanged through an interface, they should be encrypted so as to securely transmit them.

Figure 17:
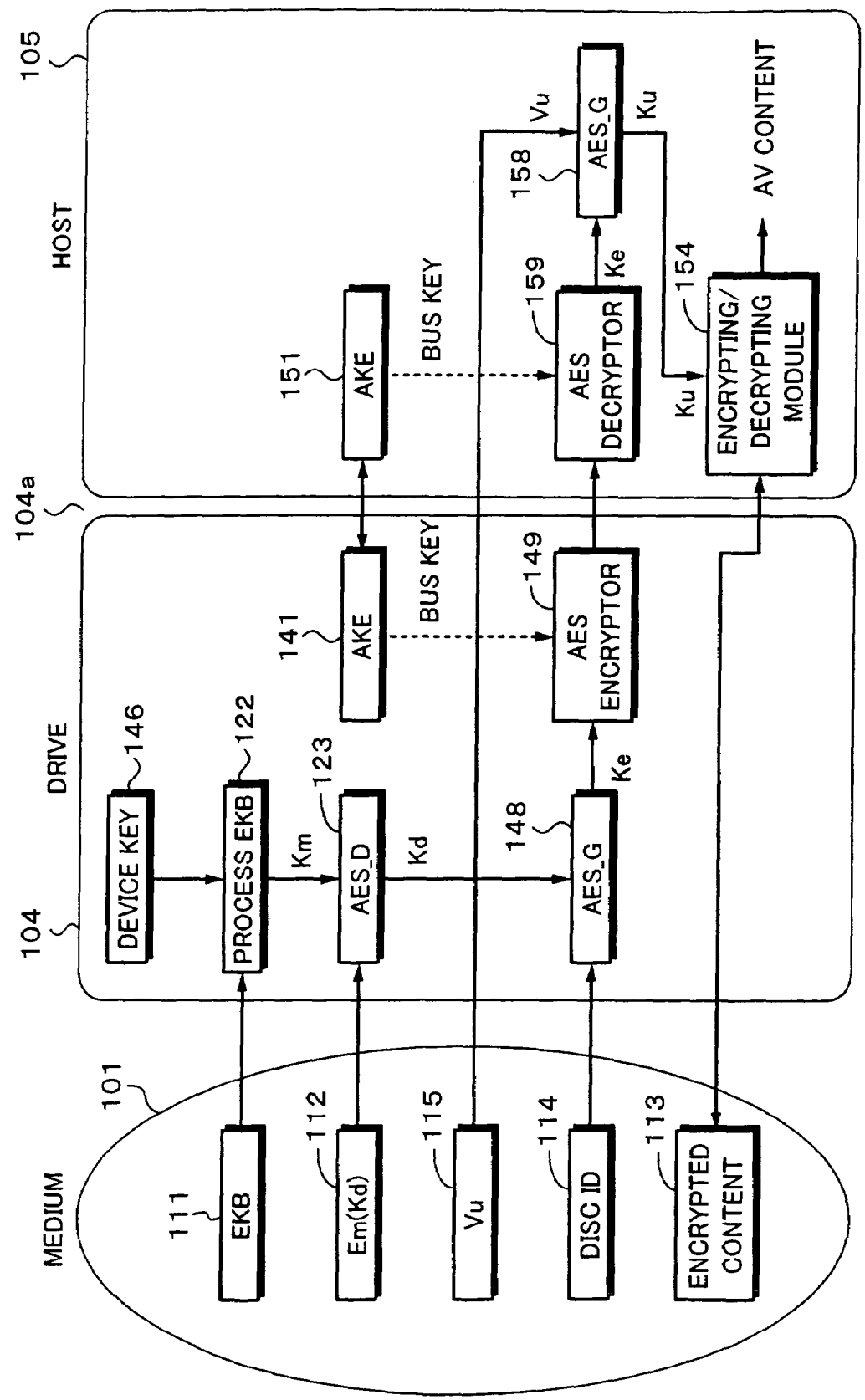
FIG. 17 is a block diagram showing a PC based writable medium recording and reproducing system according to an eighth embodiment of the present invention.

In FIG. 17, reference numeral 101 represents a recordable medium. On the medium 101, an EKB 111, an encrypted disc key Em (Kd) 112, an encrypted content 113, a disc ID 114, and a unit key generating value Vu 115 are recoded. Like the forgoing first to seventh embodiments, in particular, the third embodiment, a CCI is recorded in association with the encrypted content 113.

Next, terminology of key information shown in FIG. 17 will be described.

An EKB 111 is a key bundle with which a medium key Km is distributed for each device key. The EKB 111 corresponds to a medium key block MKB of each of the foregoing embodiments.

A medium key Km is key information unique to each medium. When an EKB does not contain a medium key, it represents that a device key has been revoked.

A disc key Kd is key information that is unique to at least each content. A disc key Kd may be unique to each master disc of a content. An encrypted disc key Em (Kd) 112 is an encrypted key of which a disc key Kd is encrypted with a medium key Km. An encrypted disc key Em (Kd) 112 is recorded on the medium 101. An encrypted disc key Em (Kd) 112 is used to generate an embedded key Ke that is unique to each medium. An encrypted disc key Em (Kd) 112 corresponds to a parameter A (that is used to generate a medium unique key in the drive 4) of the fifth to seventh embodiments.

A unit key generating value Vu 115 is a parameter that can be defined for each encryption unit. Each encryption unit is composed of a plurality of sectors. A unit key generating value Vu 115 is used to generate a unit key Ku with which a host 105 decrypts an encrypted content 113. A unit key generating value Vu 115 corresponds to a parameter B (used to encrypt/decrypt an encrypted content 13 of the host 5) of the fifth to seventh embodiments.

A disc ID 114 is an ID that is unique to each stamper. A disc ID 114 corresponds to a medium ID of the third embodiment.

An embedded key Ke is key information that is unique to each medium. An embedded key Ke corresponds to a medium unique key of the third embodiment.

A medium key Km is obtained with a device key 146 of a drive 104 and an EKB 111 of the medium 101. A disc key Kd is obtained with a medium key Km and an encrypted disc key Em (Kd) 112 of the medium 101. An embedded key Ke is obtained with a disc key Kd and a disc ID 114.

A unit key Ku is a key with which an encrypted content 113 is encrypted or decrypted. A unit key Ku is obtained with an embedded key Ke and a unit key generating value Vu. A unit key Ku corresponds to a content key of each of the foregoing embodiments.

Next, an operation of the eighth embodiment will be described in accordance with a flow of the process.

First of all, AKEs 141 and 151 authenticate each other. When their authentication has been successful, a bus key is generated. A parameter (not shown in FIG. 17) in association with the authentication is supplied to at least one of the AKEs 141 and 151.

The drive 104 reads an EKB from the medium 101 and supplies the EKB to the drive 104. A process EKB 122 of the drive 104 calculates the EKB and the device key 146 received from the medium 101 and obtains a medium key Km. When the calculated result is for example 0, the device key is revoked. A device key 146 of the drive 104 is a key uniquely assigned to a drive of each model.

The drive 104 reads an encrypted device key Em (Kd) from the medium 101. An AES_D 123 decrypts the encrypted disc key Em (Kd) with a medium key Km and obtains a disc key Kd. The AES (Advanced Encryption Standard) is an encrypting method adopted by the U.S. government as a new encryption standard as a successor of the DES.

In addition, the drive 104 reads a disc ID 115 from the medium 101. An AES_G 148 calculates the disc ID and the disc key Kd and obtains an embedded key Ke.

After the drive 104 and the host 105 have authenticated each other and a bus key has been obtained, the host 105 requests the drive 104 to transfer the embedded key Ke.

When the drive 104 transfers a Ke to the host 105 through an interface 104a, an AES encryptor 149 encrypts the Ke with a bus key. An AES decryptor 159 of the host 105 decrypts the encrypted Ke and obtains the Ke. The AES encryptor 148 and the AES decryptor 149 perform a process for a CBC (Cipher Block Chaining) mode.

The host 105 processes a content in an encrypting unit. The host 105 reads a unit key generating value Vu 115 in the encrypting unit from the drive 104. An AES_G 158 calculates a unit key Ku with the embedded key Ke and the unit key generating value Vu.

The host 105 reads the encrypting unit of the encrypted content 113 in the unit of sector data. The drive 104 transfers sector data, which has been read, to the host 105. An encrypting/decrypting module 154 of the host 105 decrypts the sector data with a unit key Ku of the encrypting unit.

Next, with reference to FIG. 18, a ninth embodiment of the present invention will be described. According to the ninth embodiment, a content is reproduced from a ROM type medium 110 for example a ROM disc.

A content is pre-recorded on the ROM type medium 110. The host 105 does not need to perform an encrypting process. The host 105 has a decrypting module 160. An encrypted content that is read from the medium 110 is decrypted by the decrypting module 160. The decrypting module 160 obtains an AV content.

The ROM type medium 110 has a medium key Km and a disc key Kd as key information unique to each content. Each content is composed of one or a plurality of encrypting units.

An embedded key generating value Ve is recorded on the medium 110. An embedded key generating value Ve is a non-zero value recorded for each stamper in a disc production plant (a stamper is a disc original of which photoresist is developed or a first stamper produced from the disc original). As a physical watermark, an embedded key generating value Ve is recorded on a disc by another means.

An embedded key Ke corresponds to a medium unique key of the third embodiment. An embedded key generating value Ve with which an embedded key Ke is generated is a kind of a medium ID.

According to the ninth embodiment, the same process as the eighth embodiment is performed. First of all, AKEs 141 and 151 authenticate each other. As a result, a bus key is generated. A process EKB 122 of the drive 104 calculates an EKB and a device key 146 that are read. As a result, the EKB 122 obtains a medium key Km and performs a revoking process. An AES_D 123 decrypts the medium key Km and obtains a disc key Kd. An AES_G 148 obtains an embedded key Ke.

An AES encryptor 149 encrypts an Ke with a bus key. An AES decryptor 159 of the host 105 decrypts the encrypted Ke and obtains the Ke.

The host 105 reads a unit key generating value Vu 115 of an encrypting unit from the drive 104. An AES_G 158 calculates a unit key Ku.

A decrypting module 160 of the host 105 decrypts sector data of an encrypting unit that the host 105 requests with the unit key Ku of the encrypting unit.

According to the present invention, since information unique to an electronic apparatus or application software that is secret information of a copyright protection technology is implemented in the recording and reproducing apparatus, the application software installed therein does not need to have the secret information of the copyright protection technology. Thus, the software can withstand an analysis using reverse engineering. As a result, the safety of the copyright protection technology can be secured.

A device key that is information unique to an electronic apparatus or application software is divided into two portions that are shared by the recording and reproducing apparatus and the data processing apparatus. Thus, both the recording and reproducing apparatus and the application software can be revoked.

According to the present invention, a part of an algorithm of a copyright protection technology, for example a calculating portion for a medium unique key is implemented in the recording and reproducing apparatus. Thus, the application software of the data processing apparatus needs to have only a part of the algorithm. As a result, the software can withstand an analysis using reverse engineering. Consequently, the safety of the copyright protection technology can be secured.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention. For example, a device key may be divided into two portions. The drive and the host can share the divided portions. Alternatively, the drive may have a medium unique key calculating block.

When an encrypted content is exchanged through an interface, the encrypted content may be encrypted so as to securely transmit it. Although a parameter in association with authentication is supplied to the AKE, a list that describes invalid objects or valid objects may be supplied to the AKE.

INDUSTRIAL UTILIZATION

The foregoing description exemplifies the CPRM as a copyright protection technology and an extended CPRM. However, the present invention can be applied to other than the CPRM as a copyright protection technology. Although the present invention is applied to the PC based system, it should be noted that the present invention is not limited to a structure that is a combination of a PC and a drive. For example, the present invention can be applied to a portable moving or still picture camera system that comprises an optical disc as a medium, a drive that drives the medium, and a microcomputer that controls the drive.

The invention claimed is:

1. A recording and reproducing apparatus, comprising:
   a recording medium having at least one of a recording portion for recording encrypted data to the recording medium having first information that is unique thereto and a reproducing portion for reproducing encrypted data recorded on the recording medium;
   a storing portion for storing second information uniquely assigned to a valid electronic apparatus or valid application software; and
   a connecting portion for mutually authenticating a data processing apparatus for at least encrypting data or decrypting encrypted data with a key generated in accordance with both the first information unique to the recording medium and the second information stored in the storing portion,
   wherein a part of the second information is stored in the storing portion,
   wherein the other part of the second information is stored in the data processing apparatus, and
   wherein the part of the second information stored in the storing portion and the other part of the second information stored in the data processing apparatus are combined as the second information.

2. The recording and reproducing apparatus as set forth in claim 1
   wherein the data processing apparatus has a revoke processing portion for performing revocation with at least the second information stored in the storing portion and the first information unique to the recording medium when the second information stored in the storing portion is not information unique to a valid electronic apparatus or valid application software, and
   wherein the connecting portion is configured to send the second information stored in the storing portion to the data processing apparatus.

3. The recording and reproducing apparatus as set forth in claim 2,
   wherein the second information that is sent is encrypted.

4. The recording and reproducing apparatus as set forth in claim 1 further comprising:
   a revoke processing portion for performing revocation with the second information stored in the storing portion and the first information unique to the recording medium when the second information stored in the storing portion is not information unique to a valid electronic apparatus or valid application software.

5. A data processing apparatus, comprising:
a connecting portion for mutually authenticating a recording and reproducing apparatus for at least recording encrypted data to a recording medium having second information uniquely assigned to only a valid electronic apparatus or valid application software and first information unique thereto or reproducing encrypted data therefrom; and
a host processor having a processing portion for at least encrypting data or decrypting encrypted data with a key generated in accordance with both the first information unique to the recording medium and sent from the recording and reproducing apparatus through the connecting portion and the second information unique to the electronic apparatus or application software,
wherein a part of the second information is stored in the storing portion,
wherein the other part of the second information is stored in the recording and reproducing apparatus, and
wherein the part of the second information stored in the storing portion and the other part of the second information stored in the data processing apparatus are combined as the second information.

6. The data processing apparatus as set forth in claim 5,
wherein the data processing apparatus has a revoke processing portion for performing revocation with both the second information sent from the recording and reproducing apparatus through the connecting portion and the first information unique to the recording medium when the second information is not information unique to a valid electronic apparatus or valid application software.

7. The data processing apparatus as set forth in claim 6, further comprising:
decrypting means for decrypting the second information.

8. A recording and reproducing apparatus, comprising:
a recording medium having at least one of a recording portion for recording encrypted data to the recording medium on which first information for revoking an invalid electronic apparatus, second information that uniquely identifies a content, third information that is defined for each encrypting unit, and identification data that uniquely identifies a stamper are recorded and a reproducing portion for reproducing encrypted data from the recording medium;
a storing portion for storing fourth information uniquely assigned to a valid electronic apparatus or valid application software,
a revoke processing portion for determining whether or not the stored fourth information is information unique to a valid electronic apparatus or valid application software in accordance with the first information and the fourth information; and
a calculating portion for obtaining intermediate key information unique to each recording medium in accordance with the first information, the fourth information, the second information, and the identification data when the revoke processing portion has determined that the fourth information is information unique to a valid electronic apparatus or valid application software.

9. The recording and reproducing apparatus as set forth in claim 8, further comprising:
an authenticating portion for mutually authenticating a data processing apparatus for at least encrypting data or decrypting encrypted data with a key generated in accordance with the intermediate key information; and
an intermediate key information encrypting portion for encrypting the intermediate key information with a bus key generated when the authentication has been successful and sending the encrypted intermediate key information to the data processing apparatus.

10. A data processing apparatus, comprising:
a host processor having an authenticating portion for authenticating a recording and reproducing apparatus for at least recording and reproducing encrypted data to and from a recording medium on which fourth information uniquely assigned to a valid electronic apparatus or valid application software, first information for revoking an invalid electronic apparatus, second information that uniquely identifies content, third information that is defined for each encrypting unit, and identification data that uniquely identifies a stamper are recorded;
a key information decrypting portion for receiving from the recording and reproducing apparatus intermediate key information unique to each recording medium, the intermediate key information being generated in accordance with the first information, the fourth information, the second information, and the identification data having encrypted with a bus key generated when the authentication has been successful;
an encryption key generating portion for generating an encryption key with the third information received from the recording and reproducing apparatus and the decrypted intermediate key information; and
an encrypting and decrypting portion for at least performing encryption with the encryption key or performing decryption with the encryption key.

* * * * *